United States Patent
Penacho et al.

(10) Patent No.: US 11,810,419 B2
(45) Date of Patent: Nov. 7, 2023

(54) DYNAMIC CREDIT METERS

(71) Applicant: Aristocrat Technologies, Inc., Las Vegas, NV (US)

(72) Inventors: Gary Penacho, Henderson, NV (US); Allon Englman, Las Vegas, NV (US); Patrick Finch, Las Vegas, NV (US)

(73) Assignee: Aristocrat Technologies, Inc.

( * ) Notice: Subject to any disclaimer, the term of this patent is extended or adjusted under 35 U.S.C. 154(b) by 0 days.

(21) Appl. No.: 17/449,622

(22) Filed: Sep. 30, 2021

(65) Prior Publication Data

US 2023/0029727 A1 Feb. 2, 2023

Related U.S. Application Data

(60) Provisional application No. 63/203,847, filed on Aug. 2, 2021.

(51) Int. Cl.
*G07F 17/32* (2006.01)
*G07F 17/34* (2006.01)
*G06F 7/58* (2006.01)

(52) U.S. Cl.
CPC .......... *G07F 17/3213* (2013.01); *G06F 7/588* (2013.01); *G07F 17/326* (2013.01); *G07F 17/3211* (2013.01); *G07F 17/3267* (2013.01); *G07F 17/34* (2013.01)

(58) Field of Classification Search
None
See application file for complete search history.

(56) References Cited

U.S. PATENT DOCUMENTS

| | | | |
|---|---|---|---|
| 2008/0108431 A1* | 5/2008 | Cuddy | G07F 17/3276 463/27 |
| 2010/0029381 A1 | 2/2010 | Vancura | |
| 2014/0274294 A1 | 9/2014 | Baerlocher | |
| 2015/0105138 A1* | 4/2015 | Delekta | G07F 17/3227 463/20 |
| 2018/0130308 A1 | 5/2018 | Berman | |
| 2019/0051096 A1 | 2/2019 | San | |
| 2019/0295377 A1* | 9/2019 | Suda | G07F 17/3227 |
| 2021/0366237 A1* | 11/2021 | Bouvier | G07F 17/3213 |

OTHER PUBLICATIONS

Office Action dated Oct. 6, 2022 for U.S. Appl. No. 17/449,593 (pp. 1-13).
Notice of Allowance dated Oct. 13, 2022 for U.S. Appl. No. 17/449,588 (pp. 1-22).

* cited by examiner

Primary Examiner — James S. McClellan
Assistant Examiner — Jeffrey K Wong
(74) Attorney, Agent, or Firm — Blank Rome LLP

(57) ABSTRACT

A slot game utilizes dynamic credit meters for each credit reel to accumulate value for credit symbols that land on the corresponding reel over the course of multiple spins. The game further includes a special reel that determines whether additional spins are available, and a bonus reel that adds bonus values to credit meters that have existing values.

18 Claims, 15 Drawing Sheets

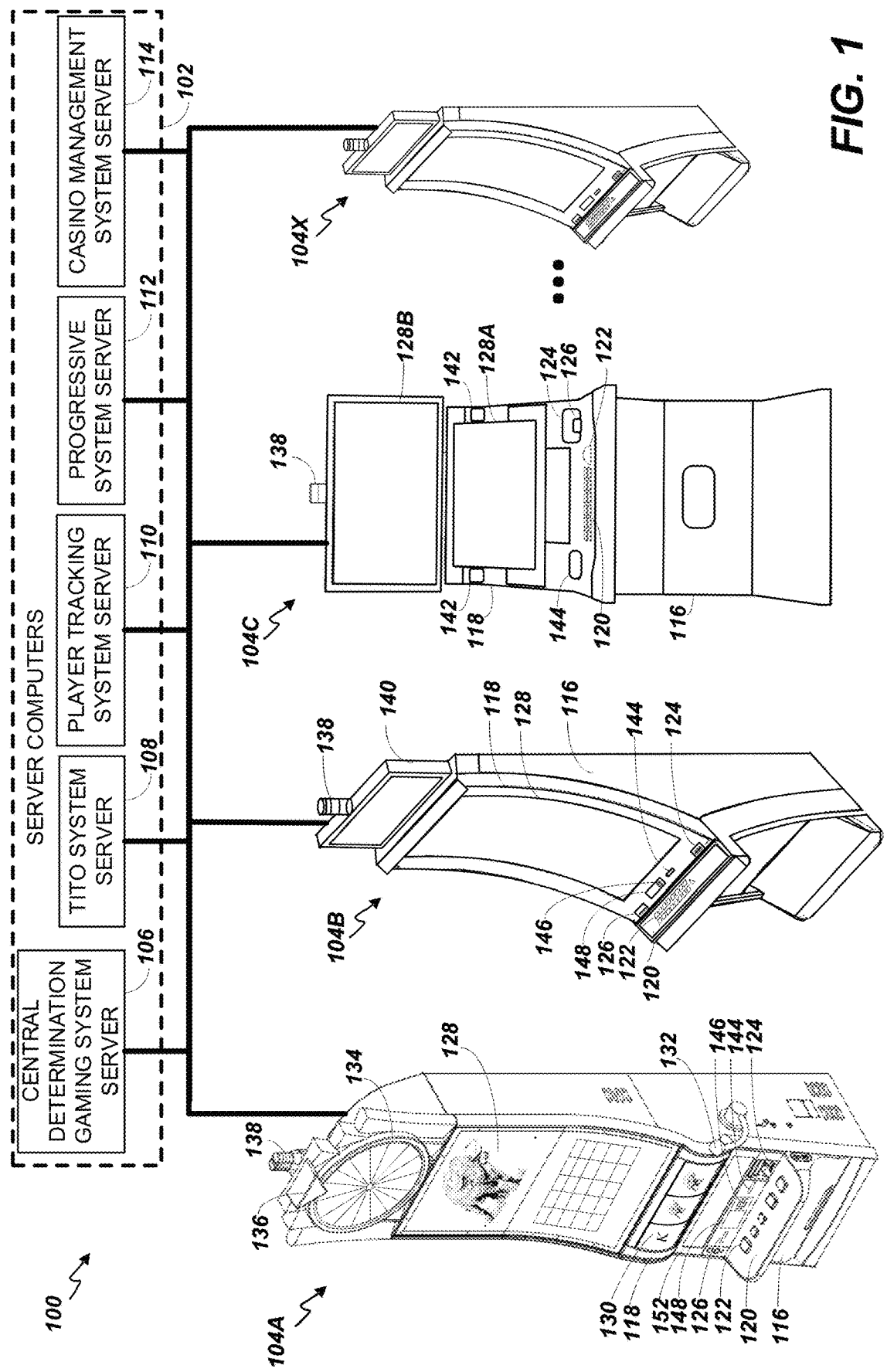

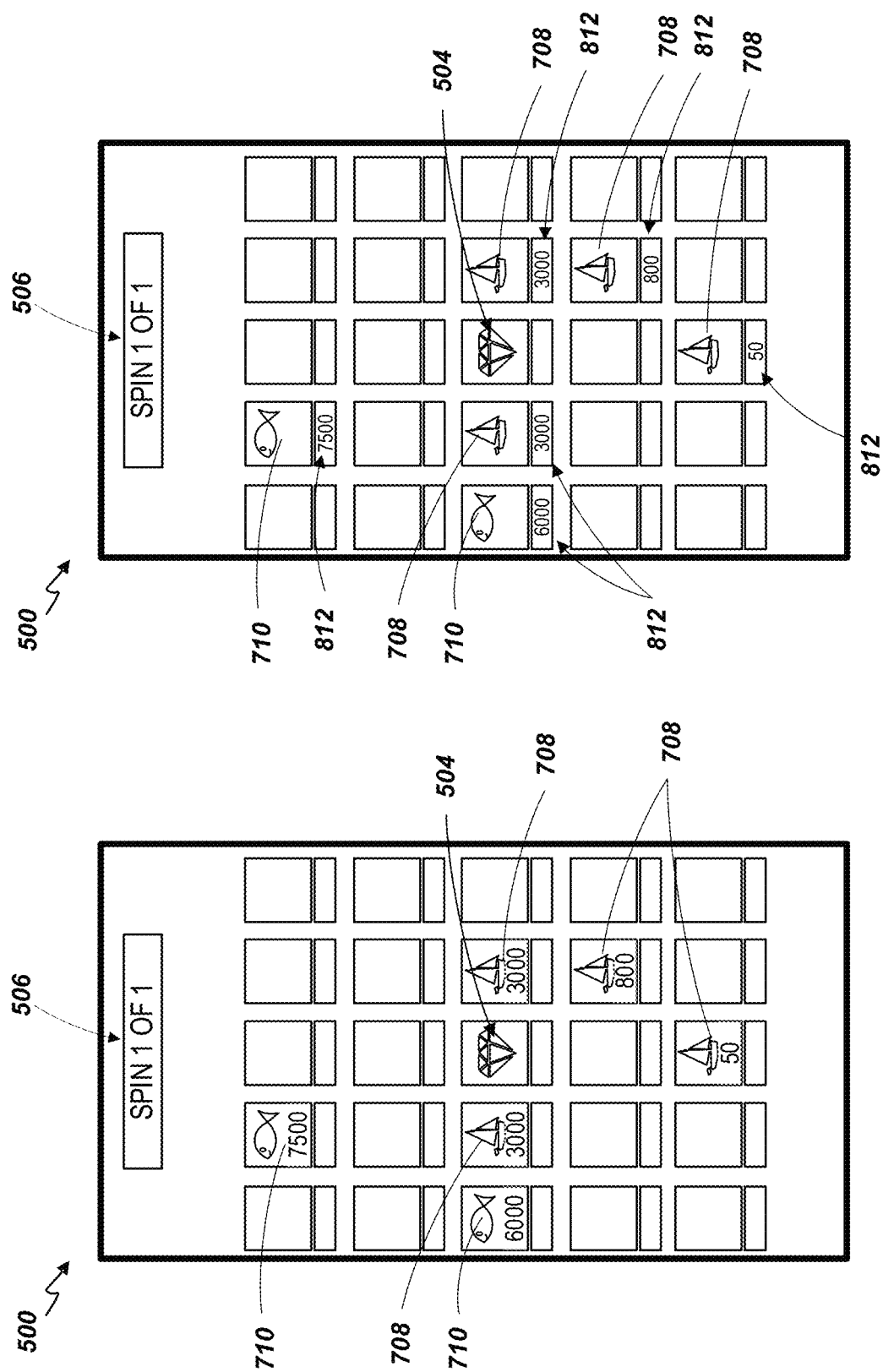

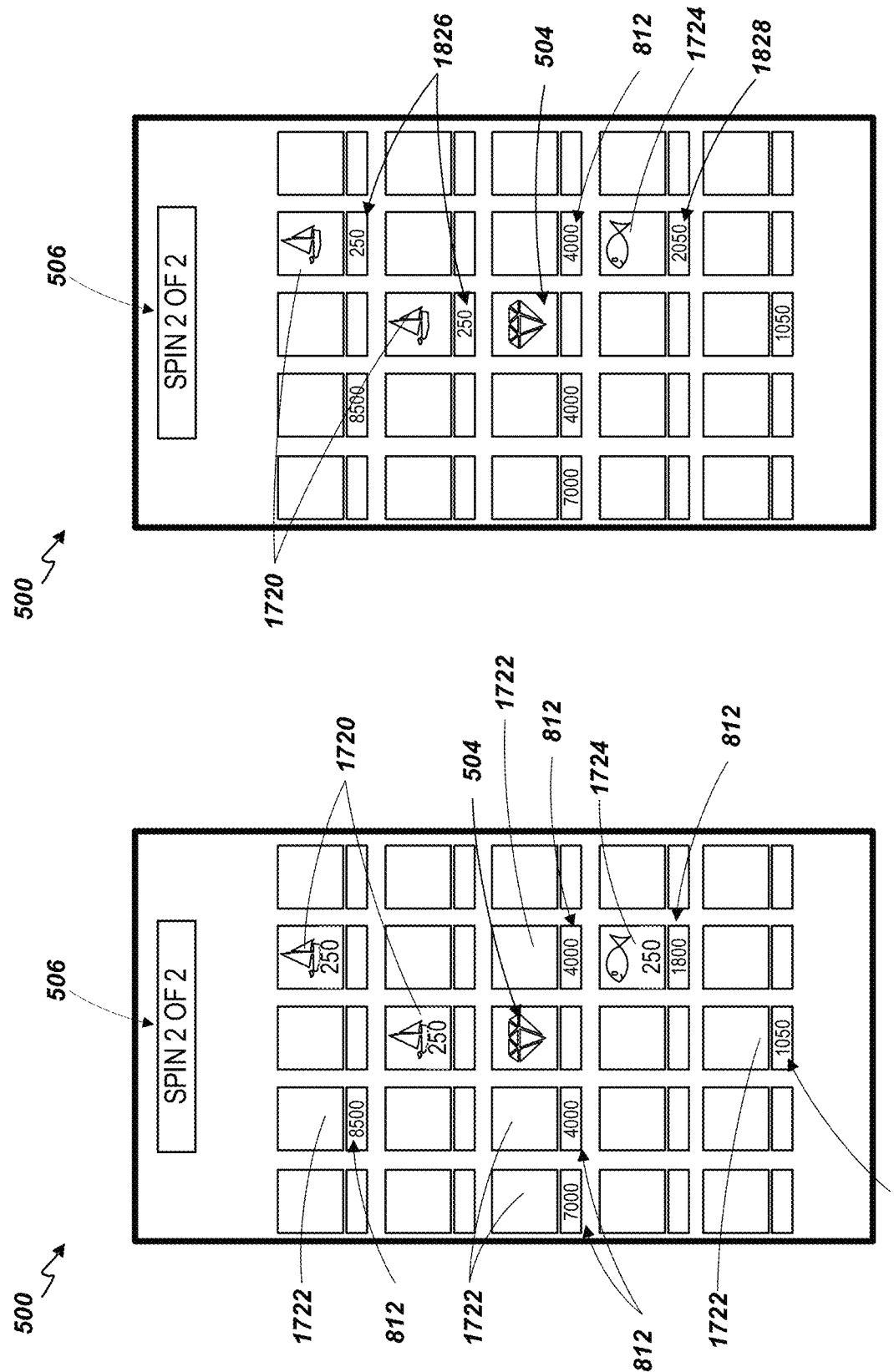

DYNAMIC CREDIT METERS

CLAIM OF PRIORITY

This application claims the benefit of priority of U.S. Provisional Application 63/203,847, filed Aug. 2, 2021, which is herein incorporated by reference in its entirety.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

SUMMARY

Some embodiments provide a gaming device, a method, and a gaming system that includes dynamic credit meters assigned to individual reels, such that each credit meter accumulates the value of credit symbols that land on a given reel over a period of spins. A special reel can determine whether additional spins are available, or the game or instance ends, and a special bonus reel can provide a bonus credit amount to each of the credit meters that have an accumulated credit value.

A first embodiment provides a system including a display system and a game controller that includes one or more processors. The game controller executes instructions which cause the game controller to randomly determine, using a random number generator, first display symbols for a plurality of credit reels as part of a first spin. Executing instructions further cause the game controller to for each credit reel that lands a first credit symbol as the first display symbol, control the display system to move a first credit value associated with the first credit symbol to a credit meter associated with the credit reel. Executing instructions further cause the game controller to randomly determine, using a random number generator, a second credit symbol as a subsequent display symbol for the credit reel as part of a second spin. Executing instructions further cause the game controller to combine the first credit value with a second credit value associated with the second credit symbol to create a combined credit value. Executing instructions further cause the game controller to control the display system to display the combined credit value at the credit meter, such that the credit meter accrues the credit value of credit symbols that land on the credit reel through multiple spins. Executing instructions further cause the game controller to randomly determine, using a random number generator and a first special reel strip, a first outcome of a special reel, the first special reel strip including a plurality of symbols that provide at least one additional spin. Executing instructions further cause the game controller to randomly determine, using a random number generator and a subsequent special reel strip, a subsequent outcome of the special reel, the subsequent special reel strip including fewer symbols that provide at least one additional spin than the first reel strip, such that the subsequent outcome is less likely to provide additional spins.

Another embodiment provides a gaming system that includes a user interface system for receiving an indication to initiate a first spin of a game, a display system including one or more displays, and a control system including one or more processors. The control system executes instructions which cause the control system to perform operations including responsive to receiving indication to initiate the first spin via the user interface, randomly selecting, using a random number generator, display symbols for a plurality of credit reels. Executing the instructions further causes the game controller to perform operations including applying one or more credit values associated with one or more credit symbols that land as display symbols to one or more respective credit meters of a plurality of credit meters. Each credit meter corresponds to a credit reel of the plurality of credit reels, such that the corresponding credit meter tracks an accumulated credit value of credit symbols that land on the credit reel over a plurality of spins. Executing the instructions further causes the game controller to perform operations including randomly selecting, using a random number generator, a display symbol from one of a plurality of special reel strips for a special reel. The special reel strips include one or more display symbols that grant an additional spin, and one or more game ending symbols, such that the outcome of the special reel determines whether the game continues for additional spins.

Another embodiment provides one or more machine-readable devices storing instructions, which when executed by one or more processors, cause performance of operations, including responsive to initiation of a first spin of a game, randomly selecting a display symbol for each of a plurality of credit reels. The display symbol for each credit reel is selected using a random number generator and a plurality of first reel strips that include at least one credit symbol. Executing the instructions further causes performance of operations including, responsive to each credit reel of a first set of credit reels landing a credit symbol, applying a credit of each credit symbol to a respective credit meter of a first set of credit meters. Each credit meter of the first set of credit meters is associated with a respective credit reel of the first set of credit reels. The first set of credit reels is a subset of the plurality of credit reels, and the first set of credit meters is a subset of a plurality of credit meters. Executing the instructions further causes performance of operations including, responsive to initiation of a second spin, randomly selecting, using a random number generator, a display symbol for the plurality of credit reels, wherein a plurality of second reel strips are used for the first set of credit reels that landed a credit symbol on the first spin. Executing the instructions further causes performance of operations including, responsive to each credit reel of a second set of credit reels landing a credit symbol, applying a credit of each credit symbol to a respective credit meter of a second set of credit meters. The second set of credit reels is a subset of the first set of credit reels and the second set of credit meters is a subset of the first set of credit meters, such that each of the credit meters of the second set of credit meters reflects an accrued credit of its associated credit reel including the credit of the second spin added to the credit of the first spin. Executing the instructions further causes performance of operations including, responsive to each credit reel of a third set of credit reels landing a credit symbol, applying a credit of each credit symbol to a respective credit meter of a third set of credit meters. The third set of credit reels does not include any credit reels of the first or second set of credit reels, and the third set of credit meters does not include any credit meters of the first or second set of credit meters. Executing the instructions further causes performance of operations including, randomly selecting, using a random number generator and a special reel strip including at least one special symbol, a display symbol for a special reel. If the special symbol lands as the display symbol of the special reel, the game continues. If a symbol other than the special symbol lands as the display symbol for the special reel, the game ends.

BRIEF DESCRIPTION OF THE DRAWINGS

FIG. 1 is an exemplary diagram showing several EGMs networked with various gaming related servers.

FIG. 7 is the example screen display of FIG. 6 after display symbols have landed on the credit meters.

FIG. 8 is the example screen display of FIG. 7 after the credit value of the credit symbols that landed in the credit reels has been applied to the corresponding credit meters.

FIG. 17 is the example screen display of FIG. 16 after display symbols have landed on the credit meters.

FIG. 18 is the example screen display of FIG. 17 after the credit value of the credit symbols that landed in the credit reels has been applied to the corresponding credit meters.

DETAILED DESCRIPTION

Figure 2A:
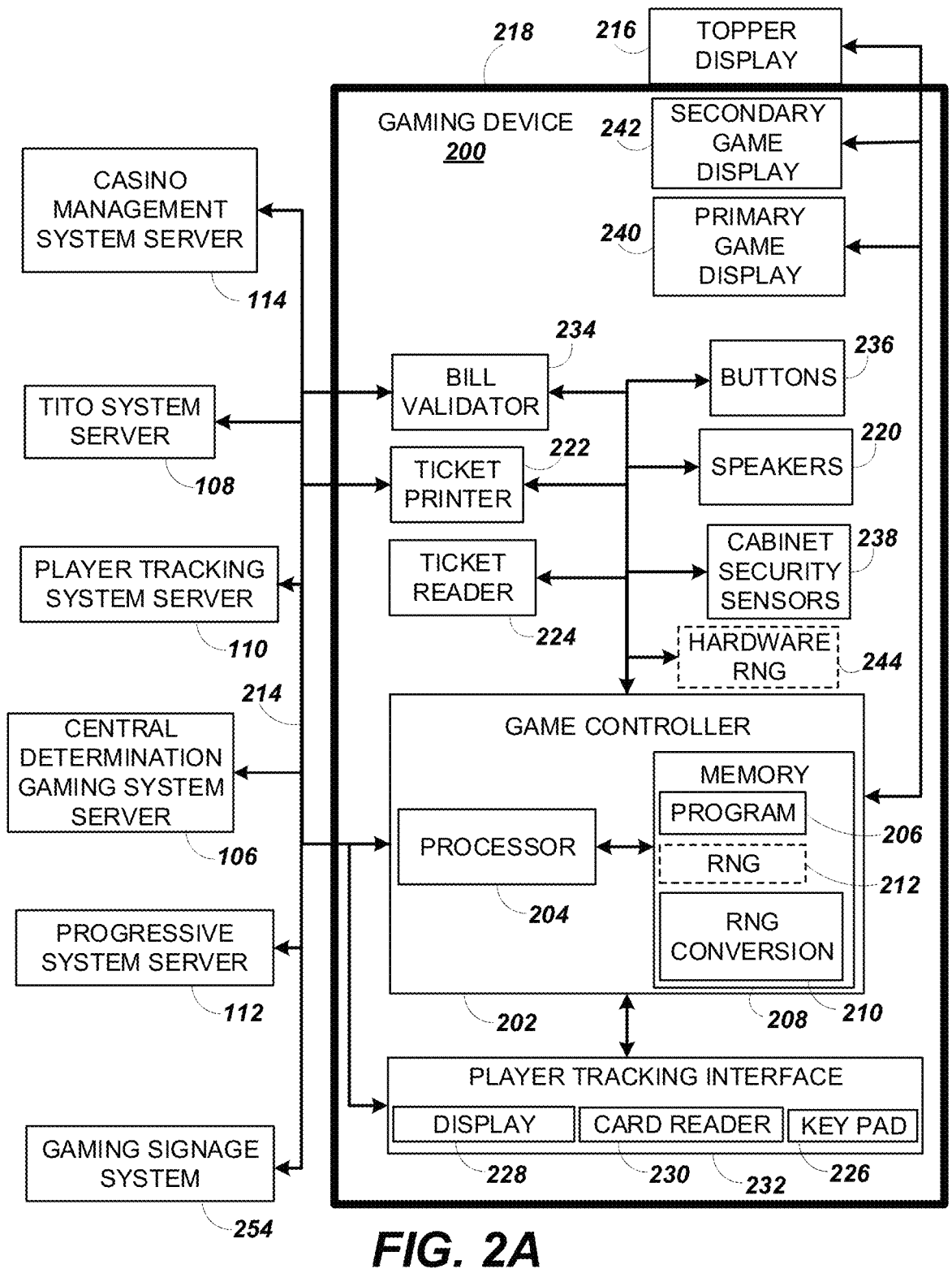
FIG. 2A is a block diagram showing various functional elements of an exemplary EGM.

The present disclosure is generally directed to providing dynamic credit meters that are each associated with an individual reel, such that the credit meter can accumulate value for credit symbols that land on the individual reel over a period of spins. In terms of technical effects, the gaming device achieves a designated game volatility and RTP that complies with regulation and provides a dynamic credit meter for each reel. In a conventional hold and spin feature, the game lands and subsequently locks credit symbols on a reel grid. By locking the credit symbols for a specific reel, the game is unable to accumulate other credit symbols on reels with credit symbols on subsequent spins. In other words, a locked reel cannot spin again to reveal/provide additional game prizes. The present disclosure addresses this shortcoming by utilizing a dynamic credit meter associated with an individual reel to allow for more credit symbols to land on the same reel while accumulating the credit values across spins. Thus, the reels are not locked in place even when landing a credit symbol.

Further, in a conventional hold and spin feature, the game awards three spins to land a credit symbol. Each time a credit symbol lands, the spin resets to three spins, giving a player three more chances to land another credit symbol. As the reel grid fills up with locked credit symbols, there is a lesser chance to land another credit symbol causing the game to eventually end. Since with the present disclosure the lock feature is no longer in effect, a special reel is used to determine whether the game should continue. Since the game feature is configured to grow the persistent credit meters over multiple spins, ensuring the game RTP complies with regulation even though the game outcomes are random based requires additional mechanisms. The present disclosure addresses this problem by reducing the hit rate of landing credit symbols and credit symbol values. Thus, the gaming device improves computer capability by achieving a designated volatility and RTP while allowing for dynamic credit meters. The dynamic credit meters also allow a player to more easily understand how their credit builds over multiple spins since the credit that lands is tracked and combined rather than locked. Providing dynamic credit meters for each individual reel that accumulate credit from credit symbols that land on the individual reel across multiple spins represents new EGM functionality not previously implemented that provides another approach to presenting how a gaming device builds equity in a game, improves the usability of the gaming device, and enhances a player's understandability of obtaining certain game outcomes.

In some examples, various described features may be implemented as part of a base game, a bonus game, a feature game, or a combination of these.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a web site maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
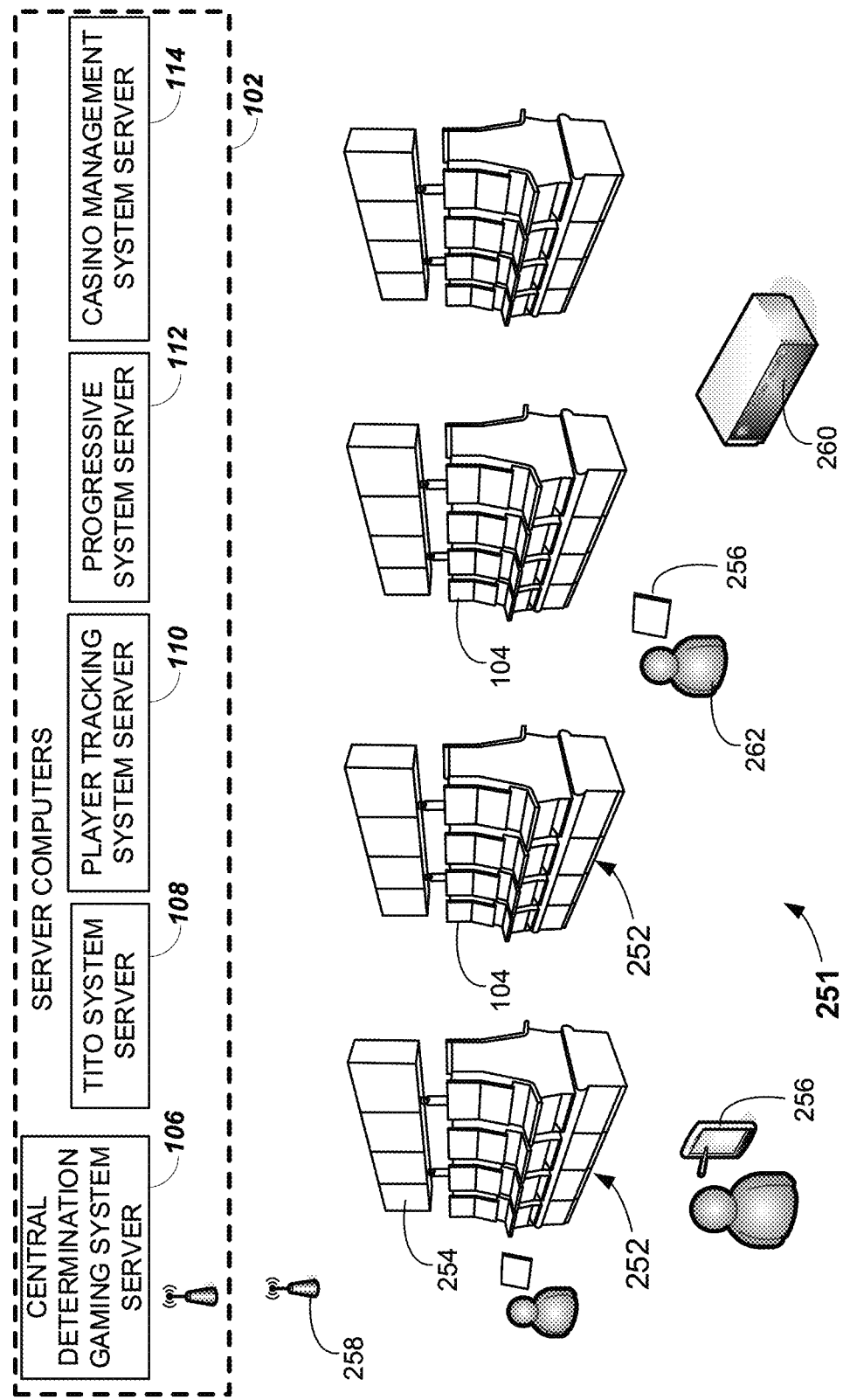
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
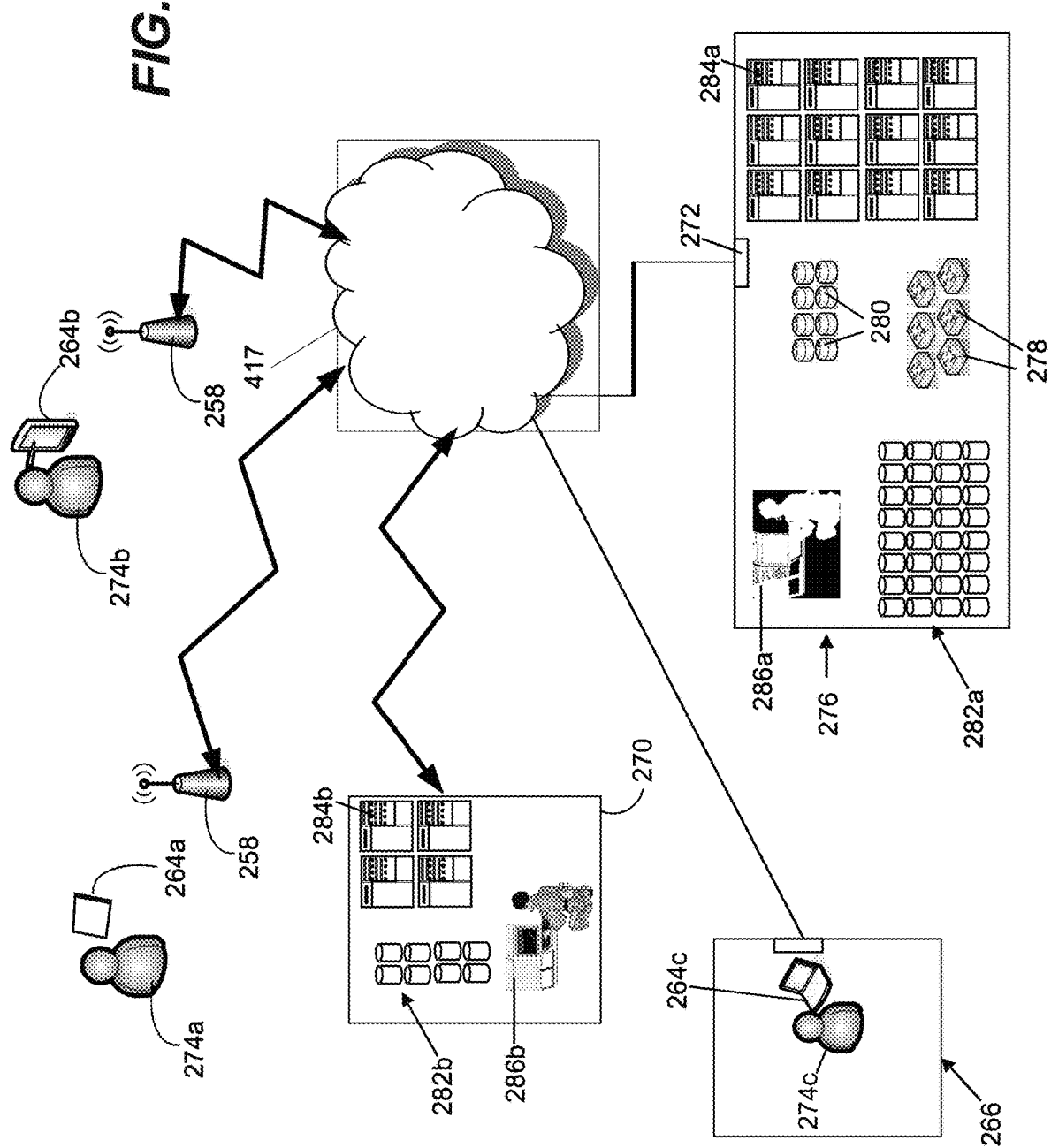
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264a, 264b and 264c are capable of communication via one or more networks 417. The networks 417 may, for example, include one or more cellular telephone networks, the Internet, etc. In this example, the EUDs 264a and 264b are mobile devices: according to this example the EUD 264a is a tablet device and the EUD 264b is a smart phone. In this implementation, the EUD 264c is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282a, servers 284a and one or more workstations 570a. The servers 284a may, for example, be configured to provide access to a library of games for online game play. In some examples, code for executing at least some of the games may initially be stored on one or more of the storage devices 282a. The code may be subsequently loaded onto a server 284a after selection by a player via an EUD and communication of that selection from the EUD via the networks 417. The server 284a onto which code for the selected game has been loaded may provide the game according to selections made by a player and indicated via the player's EUD. In other examples, code for executing at least some of the games may initially be stored on one or more of the servers 284a. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284b, storage devices 282b, and one or more workstations 286b. According to this example, the financial institution data center 270 is configured to maintain financial accounts, such as checking accounts, savings accounts, loan accounts, etc. In some implementations one or more of the authorized users 274a-274c may maintain at least one financial account with the financial institution that is serviced via the financial institution data center 270.

According to some implementations, the gaming data center 276 may be configured to provide online wagering games in which money may be won or lost. According to some such implementations, one or more of the servers 284a may be configured to monitor player credit balances, which may be expressed in game credits, in currency units, or in any other appropriate manner. In some implementations, the server(s) 284a may be configured to obtain financial credits from and/or provide financial credits to one or more financial institutions, according to a player's "cash in" selections, wagering game results and a player's "cash out" instructions. According to some such implementations, the server(s) 284a may be configured to electronically credit or debit the account of a player that is maintained by a financial institution, e.g., an account that is maintained via the financial institution data center 270. The server(s) 284a may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274a-274c), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
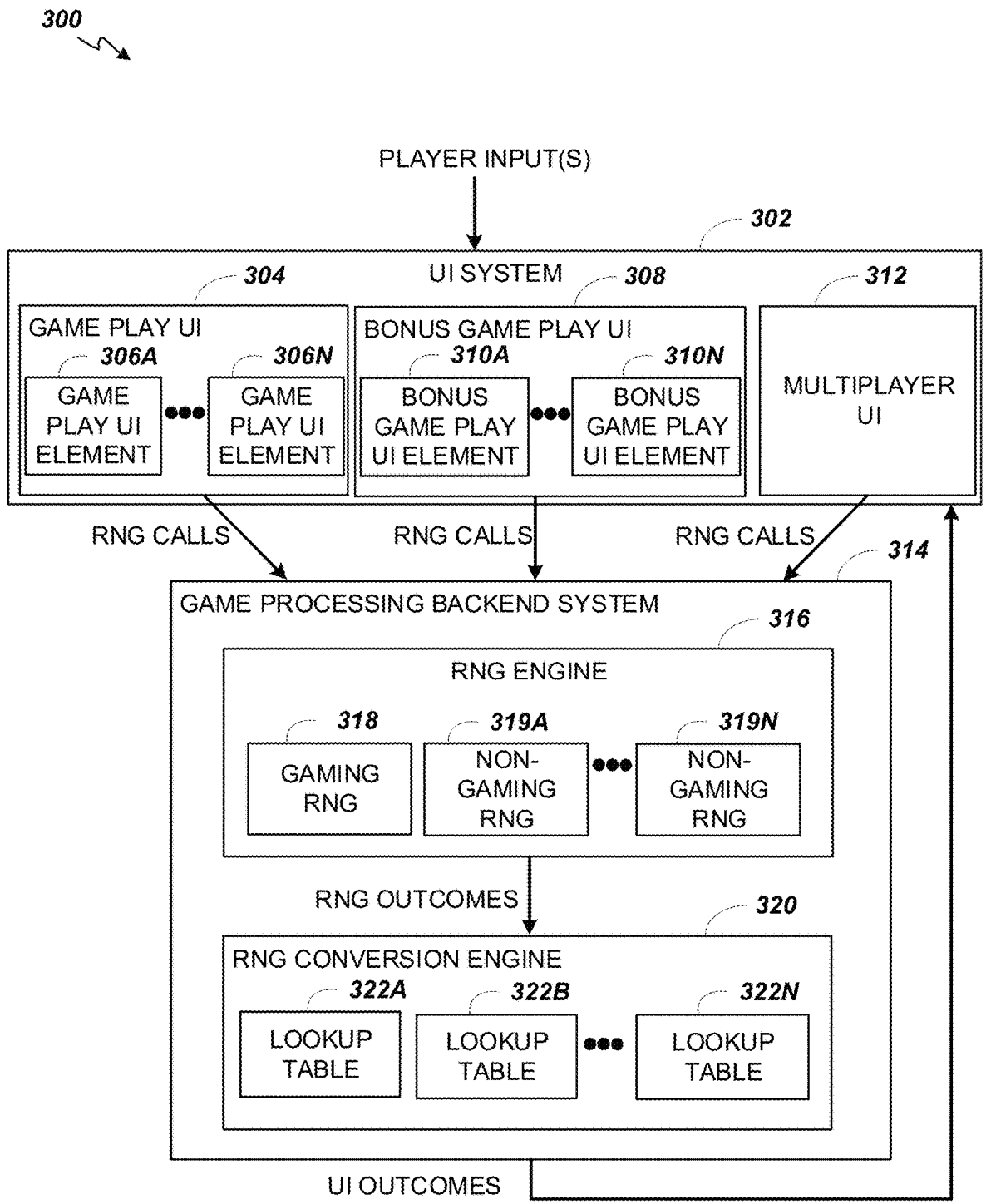
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N.

Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

The example game processing architecture 300 shown in FIG. 3 can be used to process game play instructions and generate outcomes as follows. In some example implementations, the game processing architecture 300 implements a game processing pipeline for a process (e.g. base reel game, bonus reel game, feature reel game, etc.) that provides dynamic credit meters for individual reels to accumulate the value of credit symbols that land on the reel over a period of spins. The UI system 302 (e.g., the game play UI 304 or bonus game play UI 308 of the UI system 302) causes the display system (e.g. display 240, 242) to display dynamic credit meters collecting credit from the symbols on the respective reel and a spin real that determines whether an additional spin is awarded or the game or instance ends. For a play, the UI system 302 (e.g., the game play UI 304 or bonus game play UI 308) makes one or more RNG calls to the game processing backend system 314. In response, the backend system 314 performs various operations. For example, using a gaming RNG 318, the RNG engine 316 generates one or more random numbers, which are passed to the RNG conversion engine 320. In various embodiments, the RNG conversion engine 320, can use one or more of the random number(s) and one or more of the lookup tables 322A . . . 322N, to determine a set of display symbols to populate the reels, to select a selected symbol to substitute for the dynamic symbols, or the like. After determining a game outcome, including combining accumulated credit from dynamic credit meters, the backend system 314 performs a pay evaluation or otherwise determines results (e.g., calculating whether any win conditions exist). The backend system 314 returns generated result to the game play UI 304 or bonus game play UI 308 of the UI system 302, which can among other operations control display of the game outcome and results corresponding to the pay evaluation. For example, the game play UI 304 or bonus game play UI 308 in various embodiments may stop the spinning of reels at the display symbols determined for respective reel outcomes, move credit from credit symbols to dynamic credit meters, zoom in on special reel, apply a bonus credit reel outcome to all dynamic credit meters, indicate win paths, or the like.

In general, the generated results returned by the backend system 314 can include game-related information (such as display symbols for the respective reels, outcomes) as well as animation effects not related to game parameters. Alternatively, the game play UI 304 (or bonus game play UI 308) can make one or more separate RNG calls to the backend system 314 to determine animation effects. In response, the backend system 314 can use the gaming RNG 318 and/or one or more of the non-gaming RNGs 319A . . . 319N to generate random numbers, which the RNG conversion engine 320 uses (with one or more of the lookup tables 322A . . . 322N) to determine animation effects. The game play UI 304 (or bonus game play UI 308) can perform operations consistent with the animation effects, which are returned from the backend system 314.

Figure 4:
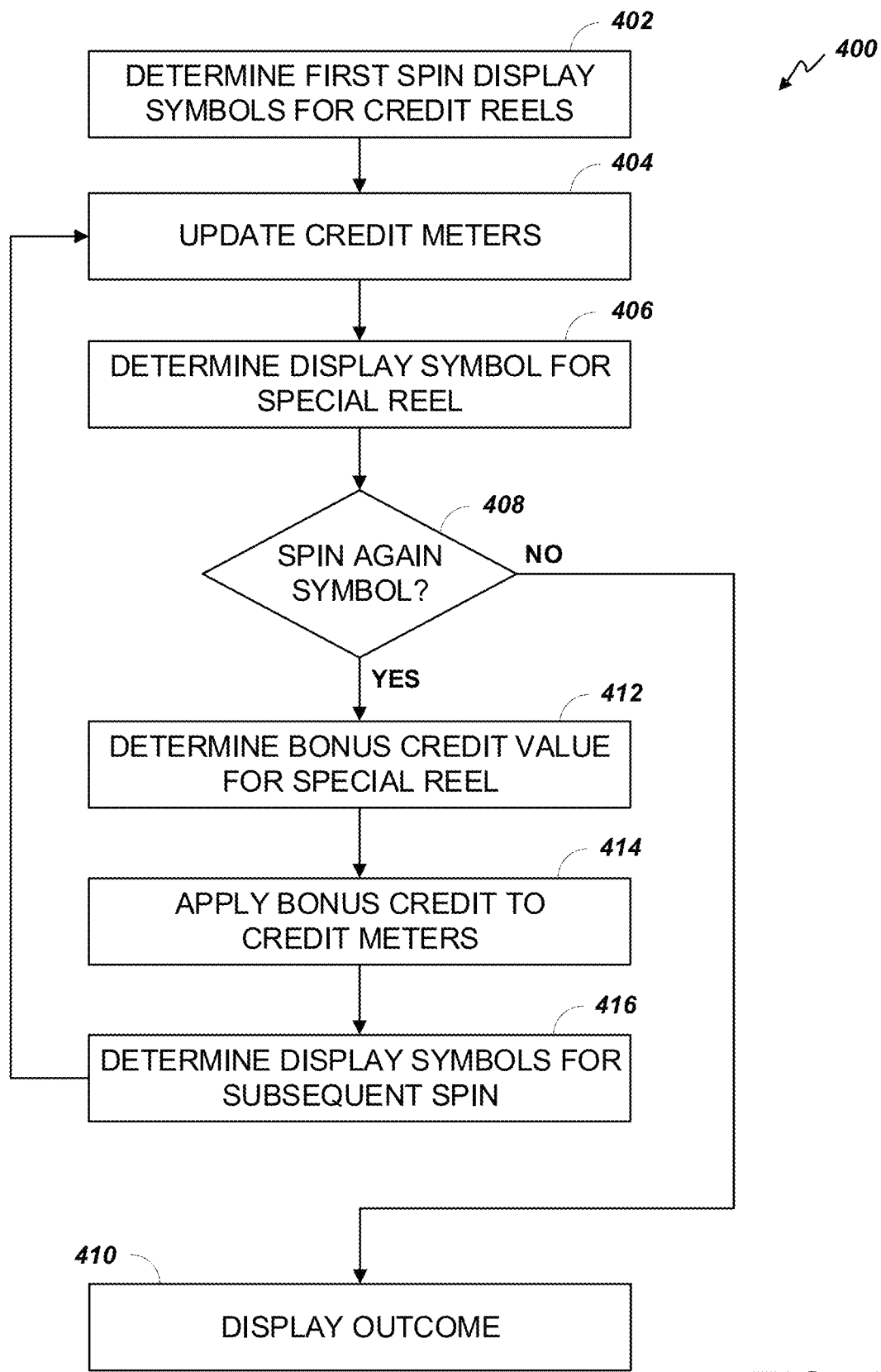
FIG. 4 is a flowchart illustrating an example method for utilizing reels with dynamic credit meters to account for landing credit symbols multiple times.

FIG. 4 is a flowchart illustrating an example method 400 for utilizing reels with dynamic credit meters to account for landing credit symbols multiple times. At 402 the game controller 202 randomly determines, using a random number generator, display symbols for credit reels for a first spin. In some examples, the display symbols are selected from a set of symbols that includes credit symbols having different credit values and symbols without credit value. In some examples, the credit reels are individual reels, such that each credit reel lands a single display symbol. In at least one example, there are 24 credit reels. At 404, the controller applies the credit values of credit symbols that landed as a display symbol to the credit meter corresponding to the respective credit reel. The dynamic credit meters keep track of the credit that accrues in the respective credit reel with each credit symbol that lands on the credit reel over a series of spins (e.g., throughout a game instance or throughout a game). At 406 the game controller 202 randomly determines, using a random number generator, a display symbol for a special reel. In at least one example, the display symbol for the special reel is selected from a set of display symbols that only has two different types of symbols: a spin again symbol, or a game over symbol. In such examples, the spin again symbol and the game over symbol can each comprise any symbol, color, shape, lettering, numbering, etc., and can even be a blank reel. In other examples, the display symbol for the special reel is selected from a set of display symbols that includes more than two types of symbols, or two different symbols than described. In other examples, the display symbol for the special reel is selected from a set of symbols that includes at least a special symbol that adds an additional spin, and the game ends when no more spins are available to the player. In some examples, other symbols may be included in the set of symbols for the special reel, including symbols that add credit, symbols that have no effect, symbols that add an additional feature, etc.

At 408 the game controller 202 determines how to proceed depending on whether the special reel display symbol determined at 406 was the spin again symbol. In at least one example, if the spin again symbol was not selected for the special reel, the method 400 proceeds to 410, at which the game controller 202 controls a display system to display the outcome of the game or instance and the game or instance ends. In some examples, if the spin again symbol was selected as the display symbol for the special reel, the player will be awarded one or more additional spins and the method proceeds from 408 to 412. While the example is described with reference to a spin again symbol, in some examples the spin again symbol is simply a symbol that awards one or more additional spins. In some examples, landing the spin again symbol simply means that the game does not end and the method 400 proceeds from 408 to 412. At 412, the game controller 202 randomly determines, using a random number generator, a bonus credit value for the special reel. At 414, the bonus credit associated with the bonus reel or the special reel is applied to each credit meter that has a current credit value. That is, each credit meter associated with a credit reel that previously landed a credit symbol such that the credit value of the credit symbol was applied to the credit meter would additionally receive the bonus credit value. In at least one example the bonus credit value is added to the existing credit value of the credit meter. In some examples, the bonus credit value may be a multiplier such that the existing credit value of the credit meter is multiplied by the bonus credit.

At 416, the game controller 202 randomly determines, using a random number generator, display symbols for subsequent spins of the credit reels. In some examples, the set of available display symbols for a given credit reel that has previously landed a credit symbol is different than the set of display symbols for a given credit reel that has not previously landed a credit symbol. In some examples, the set of display symbols used for a given credit reel depends on the most recent credit symbol that has landed on the given credit reel. From there the method 400 returns to 404 at which the game controller 202 applies the credit values from any credit symbols that have been selected as display symbols to the corresponding credit meter. If the credit meter already had an existing value, the new value is added to the existing value such that the credit meter is assigned a sum or accrual of all credit value that has landed on the corresponding credit reel. The method 400 continues in this way until the game controller 202 randomly selects a display symbol for the special reel at 406 that is not a spin again symbol or otherwise does not grant the player an additional spin, such that the method 400 advances from 408 to 410, at which point the game controller 202 controls the display system to display the outcome. In at least one example, in order to display the outcome, the controller 202 performs a pay evaluation based on the accrued credit in the credit meters. In some examples, the bonus game or feature game returns to the base game, while in other examples the game ends. In some examples, displaying the outcome can includes spinning credit reels, moving credit from the credit reels to the credit meters, zooming in on the special reel, spinning the special reel, animating the display symbol for the special reel, zooming in on a bonus reel associated with the credit reel, spinning the bonus reel, zooming out from the bonus reel, moving a credit from the bonus reel to each of the relevant credit meters, or the like, and any combination thereof.

The disclosed method and corresponding gaming device and gaming system is technically rooted in gaming technology that generates a persistent credit meter that can accumulate its value for credit symbols that land on the corresponding credit reel to increase payout. For a given spin, when a credit symbol lands on a reel, the symbol value is moved to a credit meter associated with the reel. The credit meter for the reel continues to increase as more credit symbols land on the reel. To allow a persistent credit meter for each reel while achieving a designated game RTP and volatility, the methods, gaming devices, and gaming systems can implement several features. In some examples, on average, the rate to land a credit symbol is lowered. For example, initially 3-4 reels on average could land on a credit symbol. Moreover, the initial credit value assigned to the first credit symbol that lands on the reel can be relatively low. After a credit symbol lands on a given reel, the reel strip for that given reel is replaced with a reel strip that increases the rate the credit symbol lands and/or increases the credit value associated with the credit symbols. By doing so, the feature emphasizes the importance of continuously landing credit symbols on the same reel. To replace the lock feature in a hold and spin feature, a special reel is used to determine whether the feature continues or not. As the feature continues, the reel strip of the special reel can be replaced with one or more reel strips that make it harder to land a spin again symbol.

Figure 5:
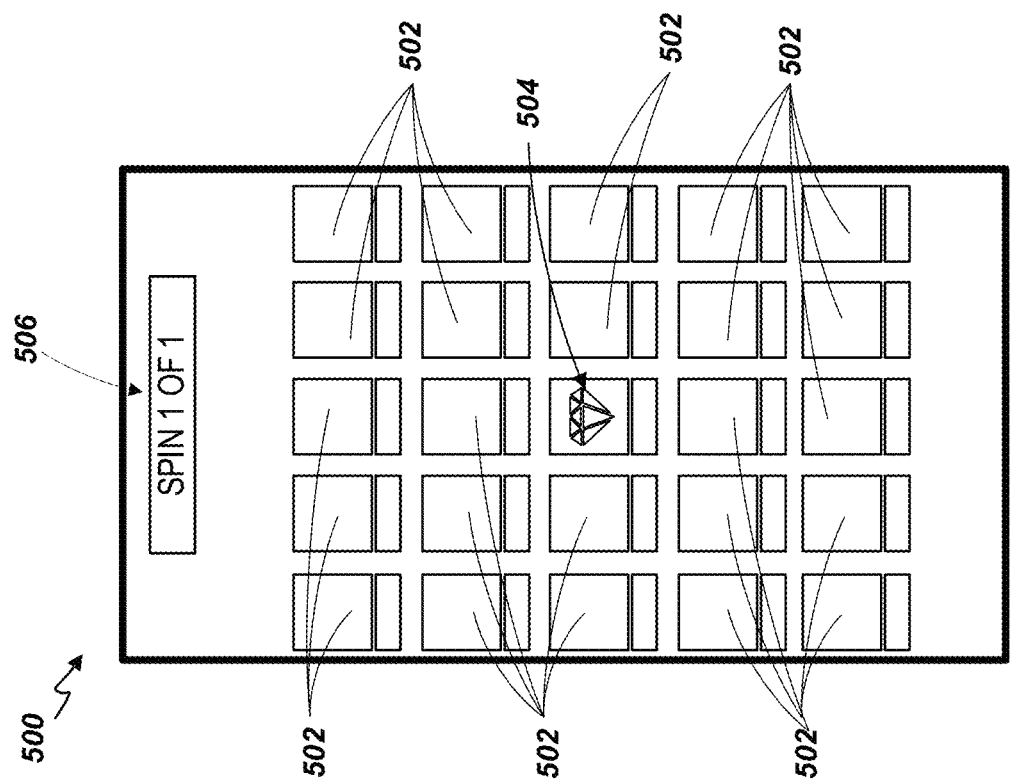
FIG. 5 is an example screen display showing credit reels with dynamic credit meters at the start of a game.

FIGS. 5-22 are example screen displays 500 showing reels with dynamic credit meters. In the illustrated examples, the screen display 500 includes a number of credit reels 502 with associated empty credit meters positioned below the credit reels 502, a special reel 504, and a spin counter 506. FIG. 5 shows an example screen display 500 at the start of a game or instance. While the credit reels 502 are blank in the illustrated example, in other examples the credit reels can display any of a variety of symbols, graphics, or animations. Similarly, while the special reel 504 of the illustrated example depicts a diamond symbol, in other examples the special reel 504 may be blank or display any of a variety of symbols, graphics, or animations.

Figure 6:
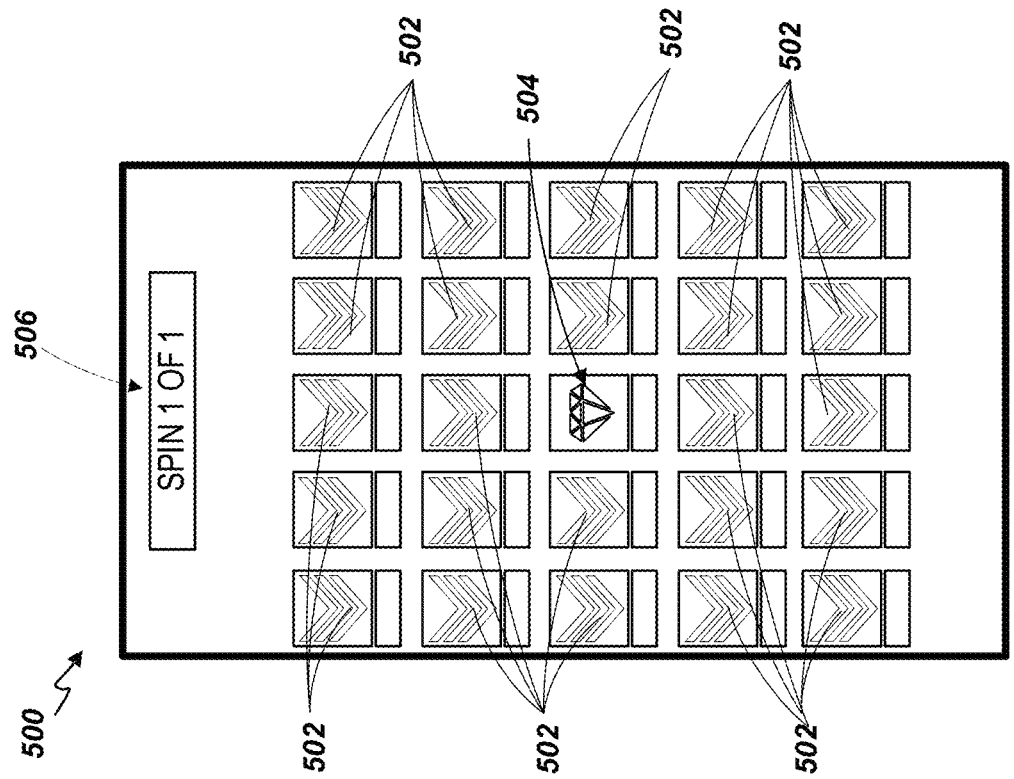
FIG. 6 is the example screen display of FIG. 5 at the start of a spin.

FIG. 6 shows the credit reels 502 spinning after receiving a user input to initiate an instance or game. In FIG. 7, a first credit symbol 708 has landed as the display symbol for a number of the credit reels 502, which display different credit values, and a second credit symbol 710 has landed as the display symbol for two credit reels 502, each displaying a different credit value. In the illustrated example, the first credit symbol 708 has landed on four credit reels 502, with credit values of 50, 800, 3000, and 3000. In the illustrated example, the second credit symbol 710 has landed on two credit reels 502, with credit values of 6000 and 7500. In the illustrated example, the credit symbols 708, 710 and associated credit values are randomly selected using a random number generator. In some examples, the credit symbols 708, 710 may be randomly selected for the credit reels 502, but the credit values associated with a given credit symbol 708, 710 is static. While certain credit symbols and values are provided for illustrative purposes, other examples may include other symbols and/or other values.

In FIG. 8, the credit values of the credit symbols 708, 710 have been applied to the respective credit meters 812. In the illustrated example, the credit meters 812 are positioned below their respective credit reels 502, however, in other examples the credit meters 812 may be positioned differently relative to their respective credit reels 502, and/or may be proportioned differently relative to their respective credit reels 502. The game controller 202 can control the display system to move the credit values to the credit meters 812.

Figure 10:
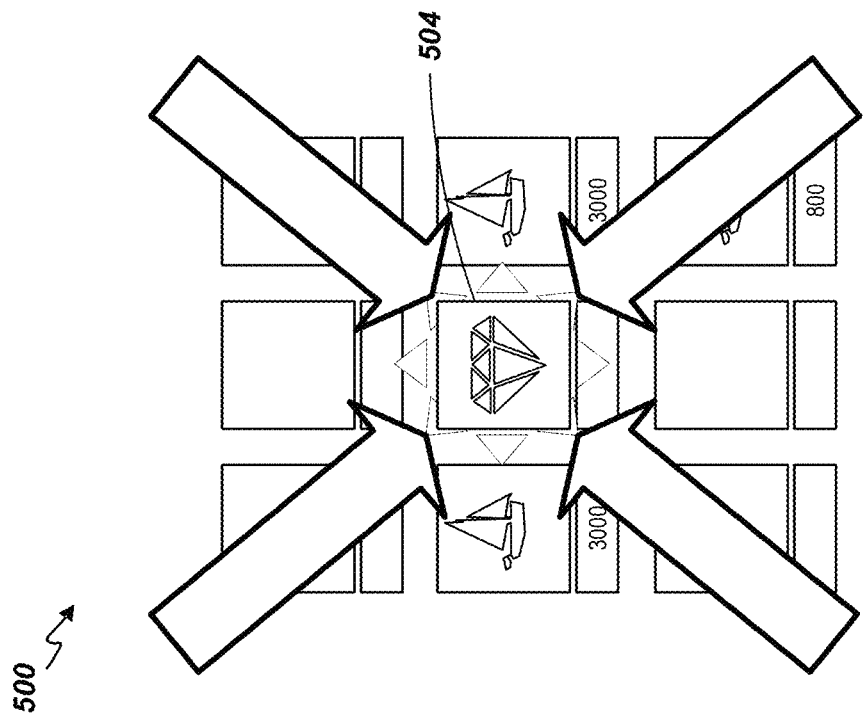
FIG. 10 is the example screen display of FIG. 9 after the special reel has landed on a "spin again" symbol.
Figure 9:
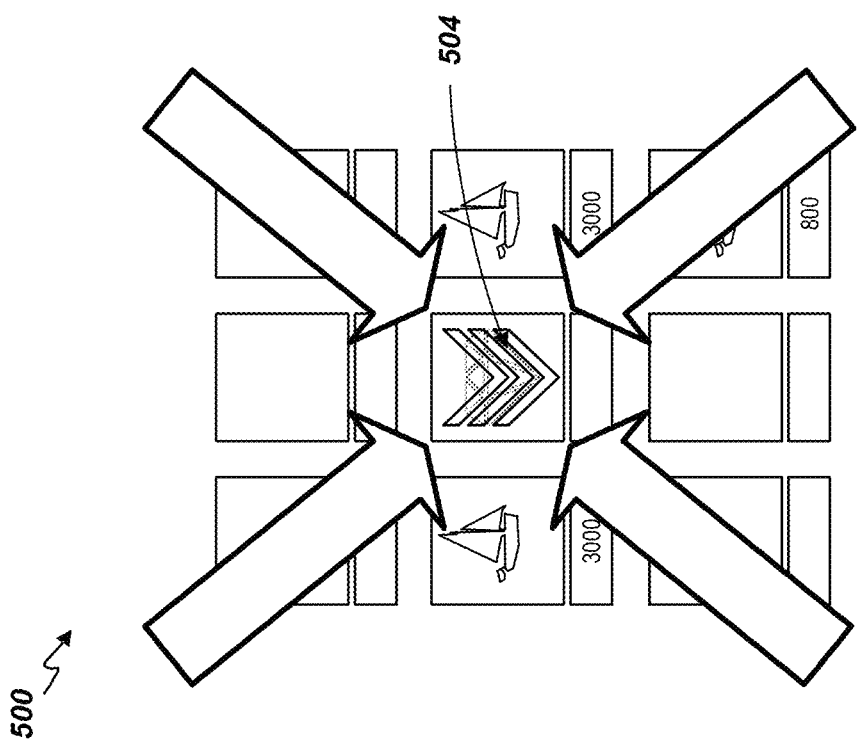
FIG. 9 is the example screen display of FIG. 8 zoomed in on the special reel while it spins.

In the example of FIG. 9, after the credit values have been applied to the credit meters 812, the screen display 500 can then zoom in on the special reel 504 while it spins. Instead of zooming in on the special reel 504, other examples may include any of a variety of animations to highlight or otherwise bring focus to the special reel 504. In at least one example, the special reel 504 is enlarged while it is spinning. In FIG. 10, the special reel 504 has landed on a "spin again" symbol indicating that the game continues, and the player can initiate another spin of the credit reels. In the illustrated example, a diamond symbol is a successful spin of the special reel 504, such that if the special reel 504 lands a diamond symbol, the player is awarded another spin. In at least one example, the landing a spin again symbol may award more than one additional spin. In some examples, different symbols may be used. In at least one example, different symbols may award different numbers of spins via the special reel 504. In at least one example, the reel strip for the special reel 504 only includes a spin again symbol and a game over symbol. In some examples, the special reel 504 only includes one or more special symbols that grant one or more additional spins, and one or more symbols that do not grant additional spins, and the game ends when no further spins remain.

Figure 12:
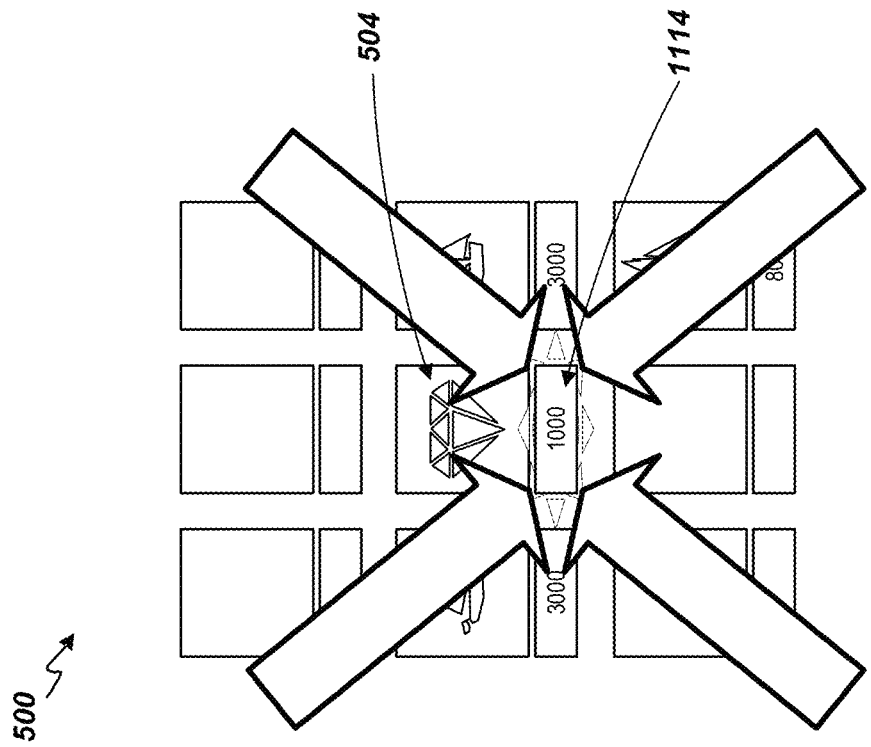
FIG. 12 is the example screen display of FIG. 11 after the bonus reel has landed a bonus value.
Figure 11:
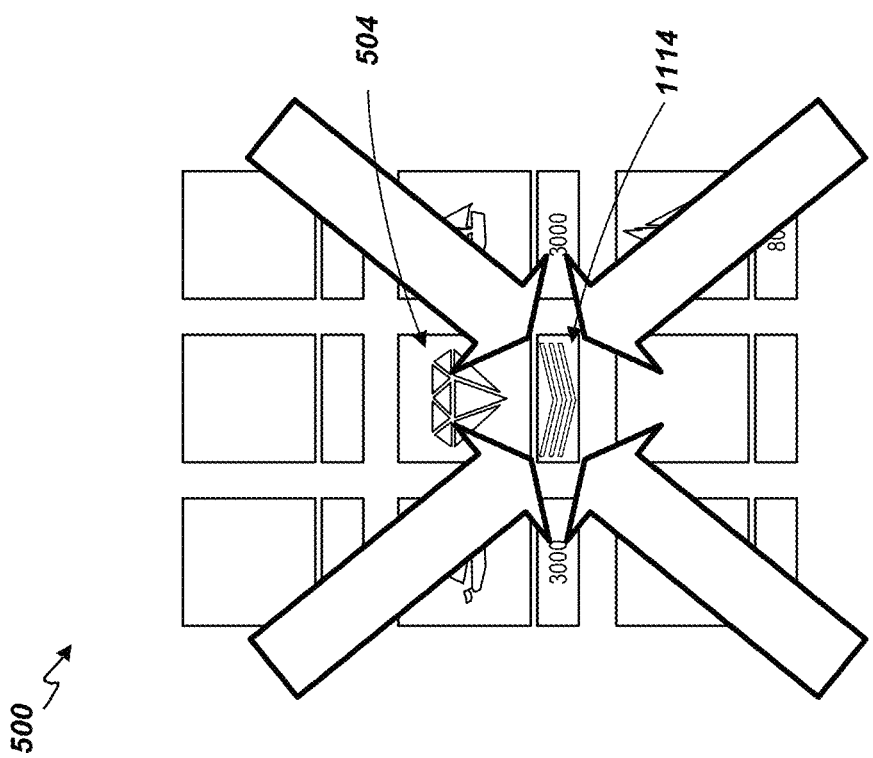
FIG. 11 is the example screen display of FIG. 10 zoomed in on the bonus reel spinning.

In FIG. 11, following a spin again symbol landing on the special reel 504, the bonus reel 1114 associated with the special reel 504 spins to reveal a bonus value. In the illustrated example, the game controller 202 controls the display screen 500 to zoom in on the bonus reel 1114. In other examples, the controller 202 can control the display system to animate or otherwise bring attention to the bonus reel 1114 in any of a variety of manners. In FIG. 12, the bonus reel 1114 lands a bonus value. In the illustrated example, the bonus reel 1114 lands a bonus value of 1000, but other examples may use any of a variety of values. In at least one example, the bonus value for the bonus reel 1114 is randomly selected using a random number generator.

Figure 14:
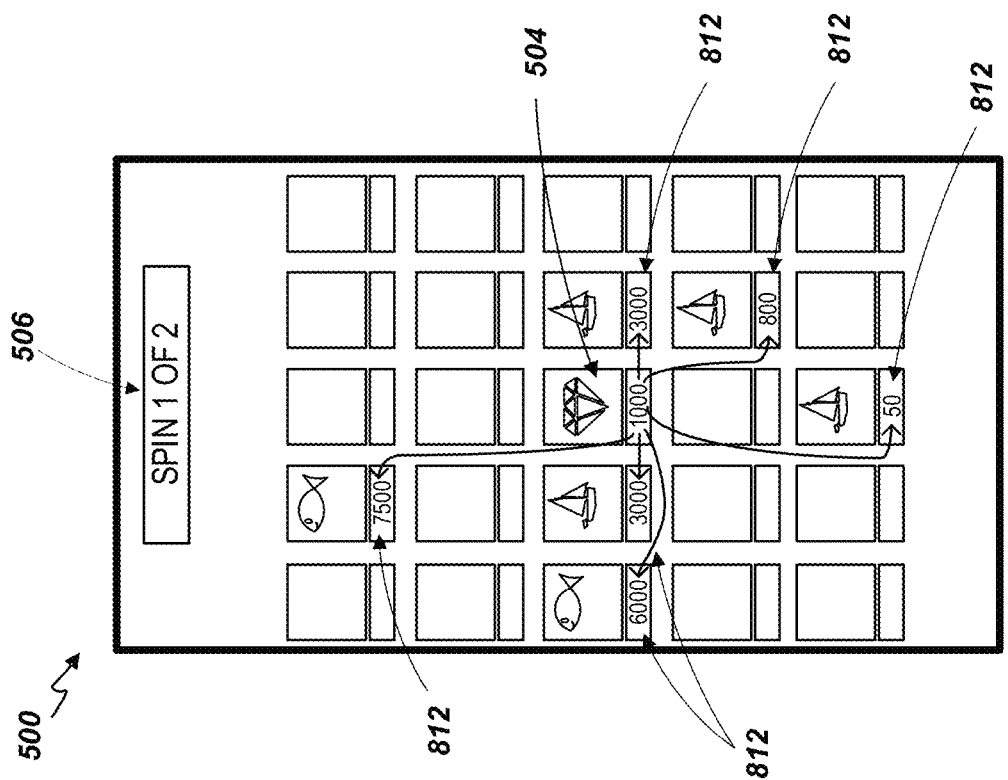
FIG. 14 is the example screen display of FIG. 13 as the bonus value of the bonus reel is applied to the credit meters that have existing values.
Figure 13:
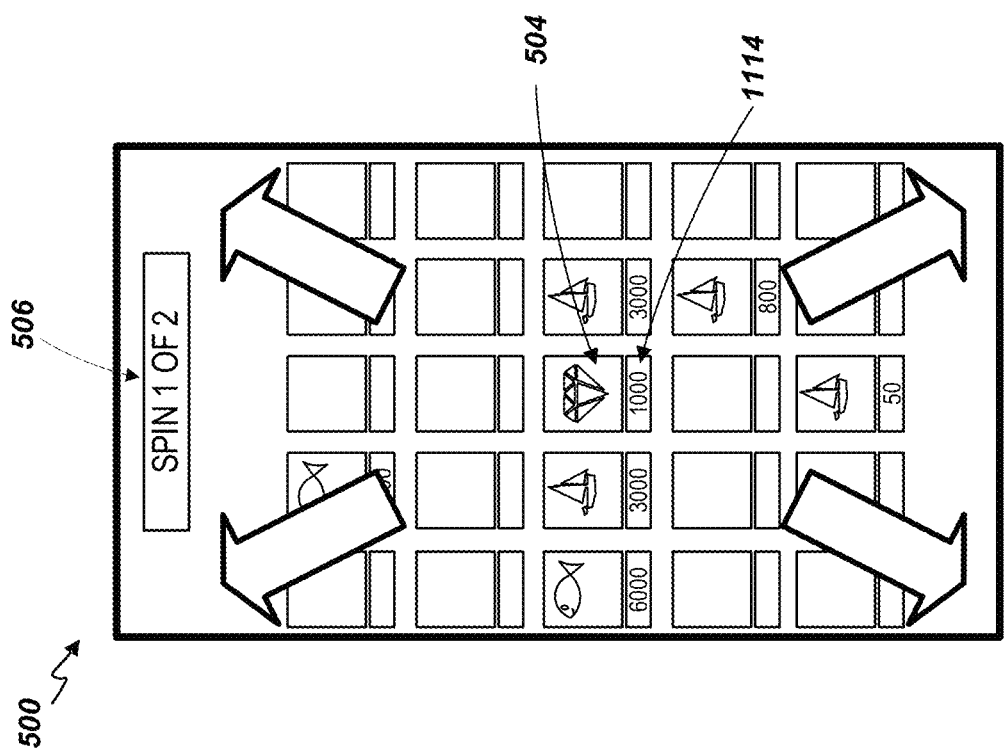
FIG. 13 is the example screen display of FIG. 12 zoomed back out from the special reel and the bonus reel.
Figure 15:
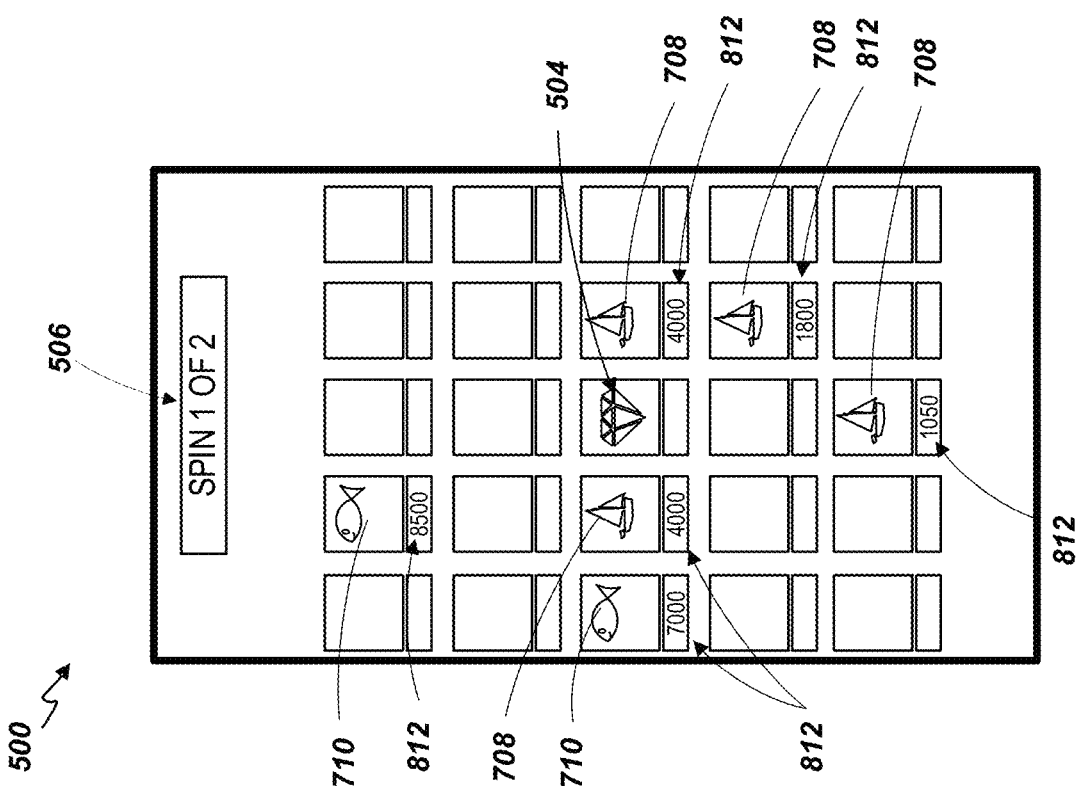
FIG. 15 is the example screen display of FIG. 14 showing the credit meters updated with the bonus value.

In the example of FIG. 13, the screen display 500 zooms back out from the special reel 504 and the bonus reel 1114. In the illustrated example, the reels 502 still display the credit symbols 708, 710 that previously landed on the reels, but in other examples, the credit reel 502 may appear blank, or display any of a variety of symbols, graphics, or animations. As illustrated, the dynamic credit meters 812 maintain the credit that has accrued on their respective credit reels 502. In FIG. 14, the bonus value of the bonus reel 1114 is applied to the credit meters 812 that already have an existing credit value or credit balance (i.e., the bonus value is added to the existing balance of each credit meter that has an existing balance and the empty credit meters do not receive the credit bonus). FIG. 15 shows the previous credit symbols 708, 710 and the new balances on the credit meters 812 reflecting the combination of the previous balance and the bonus. For example, the first credit symbols 708 had contributed values of 50, 800, 3000, and 3000 to the credit meters 812, which then received the bonus value of 1000 from the bonus reel 1114, such that those same credit meters now show values of 1050, 1800, 4000, and 4000. Similarly, the second credit symbols 710 had contributed values of 6000 and 7500 to the credit meters 812, which then received the bonus value of 1000 from the bonus reel 1114, such that those same credit meters now show values of 7000 and 8500. The spin counter 506 indicates that the player is still on spin 1 of 2 (the initial spin, plus the special reel 504 landed the "spin again" symbol for two available spins).

Figure 16:
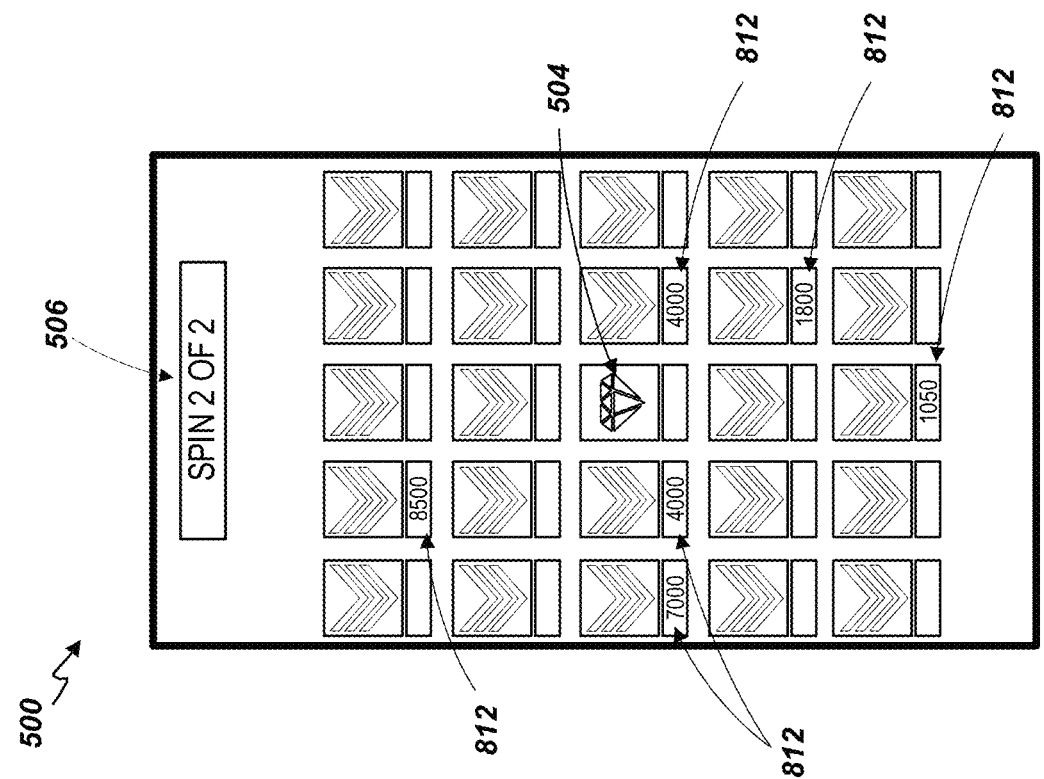
FIG. 16 is the example screen display of FIG. 15 at the start of the second spin.

In FIG. 16, the spin counter 506 has advanced to spin 2 of 2 since the credit reels 502 are spinning. The dynamic credit meters 812 maintain the accumulated credit for each credit reel 502, such that they still reflect values of 1050, 1800, 4000, 4000, 7000, and 8500. In FIG. 17, two credit symbols 1720 land as display symbols on credit reels 502 that had not previously landed a credit symbol as evidenced by their empty credit meters 812. Multiple credit reels 502 that had previously landed credit symbols land non-credit symbols 1722, such that they do not contribute any additional credit to the credit meter. Finally, one symbol 1724 lands on a credit reel 502 that landed a credit symbol on the previous spin. In some examples, after a credit symbol lands on a given credit reel, the reel strip for the given credit reel is replaced with a reel strip that increases the rate the credit symbol lands and/or that increases the credit value associated with the credit symbols. In the illustrated example, each of the credit symbols 1720, 1724 that landed has a value of 250, but other examples could include different credit symbols, different numbers of credit symbols, and different values for credit symbols.

Figure 20:
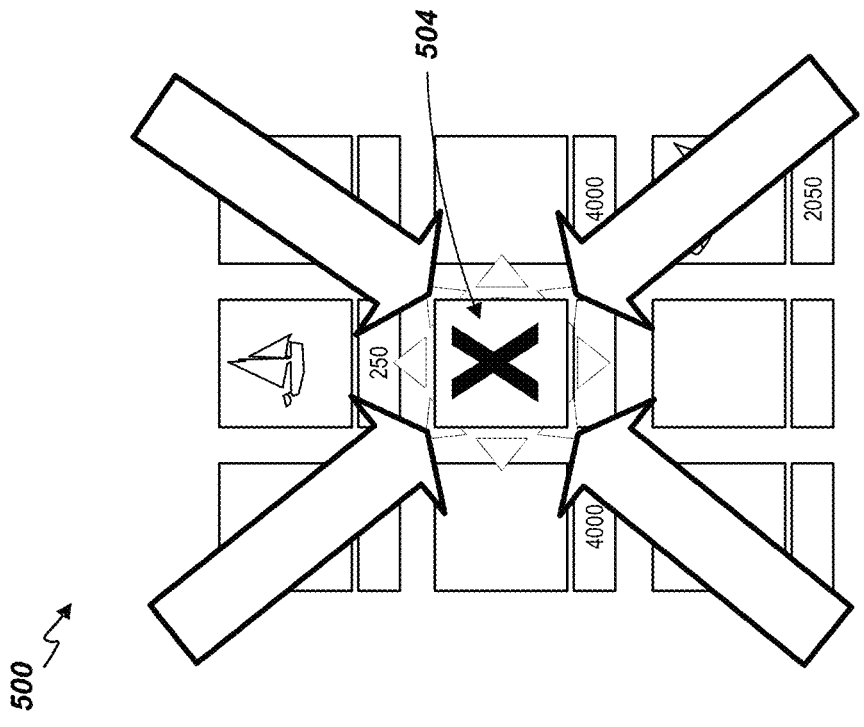
FIG. 20 is the example screen display of FIG. 19 after the special reel has landed a display symbol that does not award additional spins.
Figure 19:
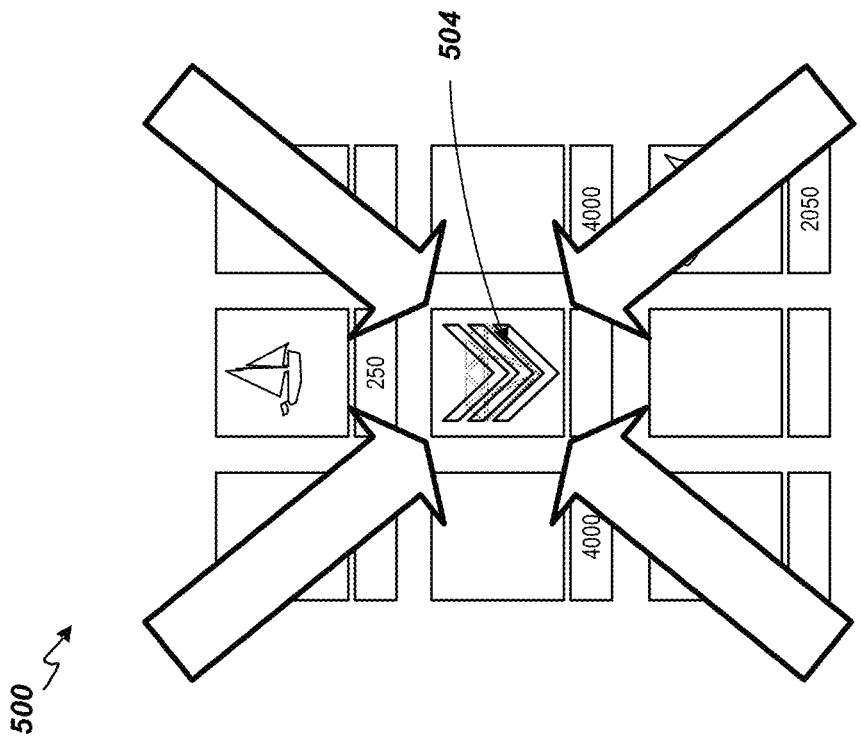
FIG. 19 is the example screen display of FIG. 18 zoomed in on the special reel while it spins.
Figure 22:
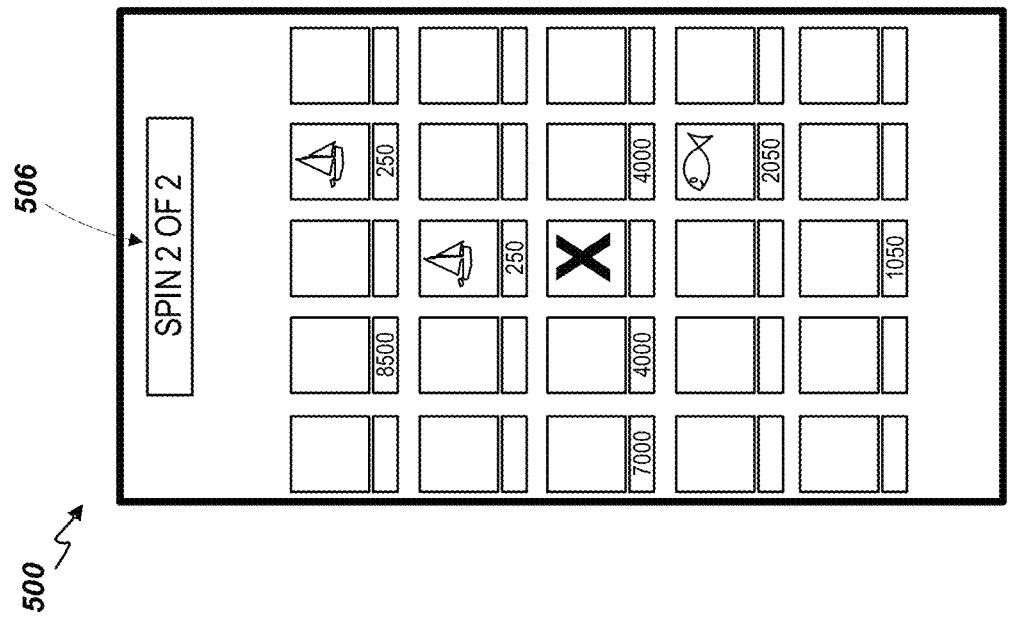
FIG. 22 is the example screen display of FIG. 21 at the end of the game after no further spins remain.
Figure 21:
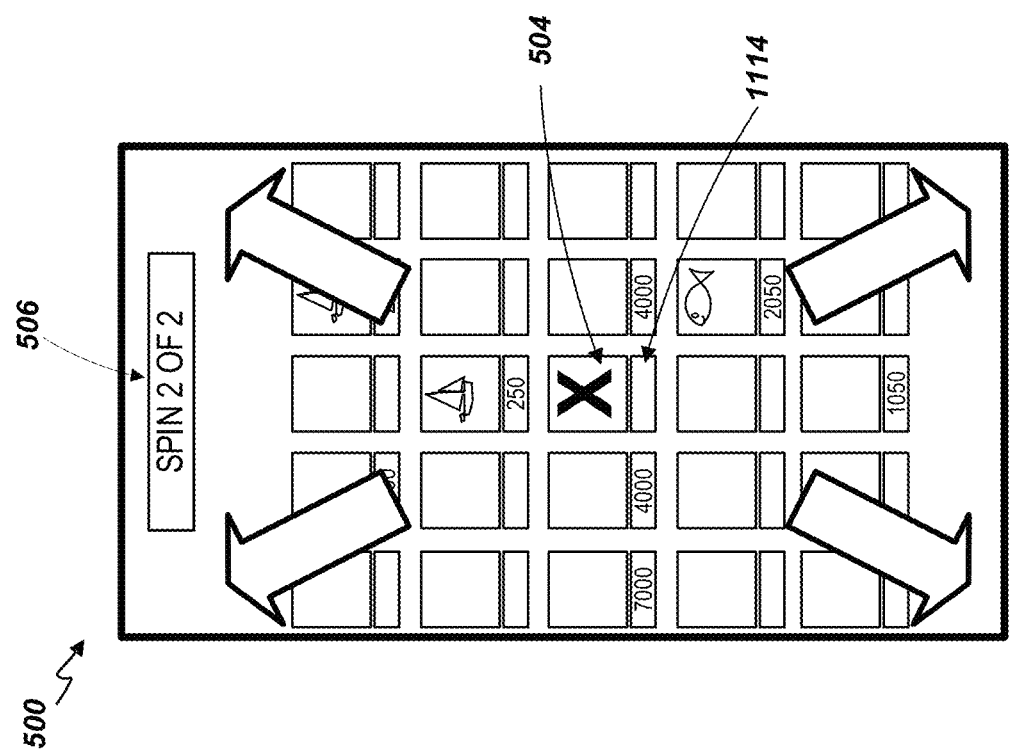
FIG. 21 is the example screen display of FIG. 20 zooming out from the special reel.

In FIG. 18, credit meters 1826 receive balances for the first time based on the value of credit symbols 1720 being applied to the corresponding credit meter 1826 which now reflects a credit value of 250. The credit from credit symbol 1724 is applied to the previous balance of the corresponding credit meter 1828, such that a value of 250 is added to the previous value of 1800 and the new value of the credit meter 1828 is 2050. Since the dynamic credit meters 812, 1826, 1828 have been updated to reflect the accrued credit for their respective credit reels 502, at FIG. 19, the display screen 500 again zooms in on the special reel 504 while it spins. In the example of FIG. 20, the special reel 504 lands a display symbol that does not provide any additional spins. In the illustrated example, the symbol shown is an "X" but in other examples could be any of a variety of symbols, graphics, animations, or could be blank. In at least one example, the display symbol that lands on the special reel 504 could provide a credit, a bonus, an additional feature, etc. even though it does not add a spin. Since the special reel 504 landed a "no spin" symbol, and no further spins remain, in FIG. 21 the spin counter 506 remains on Spin 2 of 2, and the display screen 500 zooms back out for a final pay evaluation in FIG. 22, after which point the game ends or in the case of a bonus or feature game, returns to the base game. The dynamic credit meters maintain their accumulated values for the purpose of the pay evaluation. While only two spin were shown for the sake of efficiency, the dynamic credit meters would track and accumulate credit that lands on respective credit reels through any number of spins. In at least one example, as the game continues, the reel strips for the special reel 504 include fewer and fewer "spin again" symbols, such that the further a player is in the game, the more difficult it is to land a "spin again" symbol to continue the game.

In at least one example, the game is a feature game triggered by three or more scattered special symbols in a base game. In some examples the feature is played on a 5×5 individual reel matrix, with a credit meter below each reel for credit values. In some examples, the game begins with no credit values in the credit meter. In at least one example, a single spin is initially awarded when triggered by any number of scattered special symbols in the base game. In some examples, 24 credit reels contain symbols: Credits (in the illustrated example, Sailboat or Fish) and blanks. While the illustrated example uses a specific theme, images, or symbols, other examples could use any of a variety of themes, images, symbols. etc. Further, while the illustrated example uses two credit symbols, other examples may include more or fewer credit symbols. In some examples, reel weights are used on reel strips. In some examples, with each spin all reels will stop top to bottom, from left to right. In at least one example certain credit symbols (e.g., Sailboat or Fish) on a reel will increase the credit value on the credit meter below that reel. In illustrated examples, the Sailboat will be used for credit values below 250 times bet multiplier and Fish will be used for credit values 250 or greater times bet multiplier.

In some examples, on the first spin only, 3 of the 24 credit reels will be randomly chosen to use the Sailboat reel strips and the Sailboat credit weighted table; these are guaranteed to land Sailboat credits on that credit reel. The other 21 reels will use standard reel strips and a standard weighted table, such that a Sailboat, Fish, or a blank may appear. On the second spin and onward, any reel that has a credit value will use the standard reel strip and the Fish credit weighted table, such that a Fish or a blank may appear (credits will be high enough to always be Fish). After all 24 credit reels stop, and the credits are moved to the respective credit meters, the screen will zoom in on the center Diamond reel (the special reel). The Diamond reel contains Diamond and blank options. If a Diamond lands then one extra spin is awarded, and the bonus reel (Diamond credit reel) spins. After the bonus credit reel has landed a bonus value, the view zooms out from the Diamond symbol. All reels with credit values are increased by the bonus amount on the bonus reel. "Press Play to Spin" is shown, which starts the next spin of the 24 credit reels. If a Diamond does not land on a spin of the special reel, the view zooms out from the special reel and all credit values are paid in turn to the win meter and the feature ends.

In some examples, the order of the events begins with a prompt shown for the player to Spin. The outer 24 reels (credit reels) begin spinning together, with no 'backward' spin to start. After a short period of spin time the reels will begin stopping from the top left position, down each column, and proceeding left to right. Each reel will stop a fraction of a second after the previous reel. In some examples, reels will have a bounce back when they land. In at least one example, each Sailboat or Fish will play its hit animation upon stopping. This includes the credit amount moving down (or otherwise) into that reel's credit meter. If there are already credits on that credit meter, the landed credits will add to the credit meter total. After the 24 outer reels have all stopped, after a brief pause the screen will zoom in to view the special reel up close. After a brief pause, the special reel will begin spinning. If a Diamond symbol lands, then the bonus reel will automatically start spinning. In some examples, the bonus reel will always land on a credit value. The hit animation and sound for the credit value plays. The view will zoom back out to show all 25 reels. Bonus reel credit value will travel out to each reel meter with a credit value, increasing its value by the amount of the bonus reel value. The bonus reel value will then be removed from below the special reel. The player will then hit play to begin the next spin of 24 reels. If the Diamond symbol does not land on the special reel, then the view will zoom back out to show all 25 reels. Each credit value will successively be awarded to the Win meter (in the same left/right-top/bottom order as the reel spin) and the feature ends.

An alternative implementation is to keep the initial land rate for credit symbols relatively higher with relatively higher values. After a credit symbol lands, the rate that a credit symbol lands incrementally drops by utilizing other reel types. Additionally, or alternatively, the value of the credit symbols can drop in value as more and more credit symbols land in a specific reel.

Other non-limiting example configurations are described in the following individually numbered Examples.

Example 1 is a system comprising: a display system; and a game controller comprising one or more processors, the game controller executing instructions which cause the game controller to: randomly determine, using a random number generator, first display symbols for a plurality of credit reels as part of a first spin; for each credit reel that lands a first credit symbol as the first display symbol, control the display system to move a first credit value associated with the first credit symbol to a credit meter associated with the credit reel; randomly determine, using a random number generator, a second credit symbol as a subsequent display symbol for the credit reel as part of a second spin; combine the first credit value with a second credit value associated with the second credit symbol to create a combined credit value; control the display system to display the combined credit value at the credit meter, such that the credit meter accrues the credit value of credit symbols that land on the credit reel through multiple spins; randomly determine, using a random number generator and a first special reel strip, a first outcome of a special reel, the first special reel strip including a plurality of symbols that provide at least one additional spin; and randomly determine, using a random number generator and a subsequent special reel strip, a subsequent outcome of the special reel, the subsequent special reel strip including fewer symbols that provide at least one additional spin than the first reel strip, such that the subsequent outcome is less likely to provide additional spins.

In Example 2, the subject matter of Example 1 optionally includes that executing the instructions further causes the game controller to: responsive to the first outcome of the special reel including a symbol that provides at least one additional spin, controlling the display system to indicate an additional spin is available.

In Example 3, the subject matter of Example 2 optionally includes that executing the instructions further causes the game controller to: responsive to the second outcome of the special reel including a symbol that does not provide at least one additional spin, controlling the display system to indicate that no spins remain.

In Example 4, the subject matter of any one or more of Examples 2-3 optionally include wherein executing the instructions further causes the game controller to: responsive to the first outcome of the special reel including a symbol that provides at least one additional spin, randomly determining, using a random number generator, a display symbol for a bonus reel.

In Example 5, the subject matter of Example 4 optionally includes that executing the instructions further causes the game controller to: responsive to the display symbol that lands for the bonus reel having a bonus value, adding the bonus value to the credit value of all credit meters that have existing credit values.

In Example 6, the subject matter of any one or more of Examples 1-5 optionally include wherein: the controller uses a first set of display symbols to select the first display symbol; the controller uses a second set of display symbols to select the subsequent display symbol; and the second set of display symbols has a higher ratio of credit symbols than the first set of display symbols.

In Example 7, the subject matter of any one or more of Examples 1-6 optionally include wherein: the controller uses a first set of display symbols to select the first display symbol; the controller uses a second set of display symbols to select the subsequent display symbol; and the second set of display symbols has credit symbols with higher credit values than the first set of display symbols.

In Example 8, the subject matter of any one or more of Examples 1-7 optionally include wherein determining first display symbols for a plurality of credit reels comprises: using a first set of display symbols and a first weighted table for a first portion of the plurality of credit reels; and using a second set of display symbols and a second weighted table for a second portion of the plurality of credit reels.

In Example 9, the subject matter of Example 8 optionally includes that the instructions cause the game controller to randomly select, using a random number generator, each credit reel that forms the first portion of the plurality of credit reels.

Example 10 is a gaming system, comprising: a user interface system configured for receiving an indication to initiate a first spin of a game; a display system comprising one or more displays; and a control system comprising one or more processors, wherein the control system executes instructions which cause the control system to perform operations comprising: responsive to receiving indication to initiate the first spin via the user interface, randomly selecting, using a random number generator, display symbols for a plurality of credit reels; applying one or more credit values associated with one or more credit symbols that land as display symbols to one or more respective credit meters of a plurality of credit meters, wherein each credit meter corresponds to a credit reel of the plurality of credit reels, such that the corresponding credit meter tracks an accumulated credit value of credit symbols that land on the credit reel over a plurality of spins; and randomly selecting, using a random number generator, a display symbol from one of a plurality of special reel strips for a special reel, wherein the special reel strips include one or more display symbols that grant an additional spin, and one or more game ending symbols, such that the outcome of the special reel determines whether the game continues for additional spins.

In Example 11, the subject matter of Example 10 optionally includes that executing the instructions causes the control system to perform operations further comprising: randomly selecting, using a random number generator, a bonus value for a bonus reel; and applying the bonus value of the bonus reel to credit meters.

In Example 12, the subject matter of Example 11 optionally includes that the bonus value is only applied to any credit meters that have an existing credit value greater than zero, such that: each credit meter with an existing credit value greater than zero has the existing credit value increased by the bonus value; and credit meters with an existing credit value of zero will still have a credit value of zero.

In Example 13, the subject matter of any one or more of Examples 10-12 optionally include wherein executing the instructions causes the control system to perform operations further comprising: responsive to receiving indication to initiate a subsequent spin via the user interface, randomly selecting using a random number generator, display symbols for the plurality of credit reels; and applying subsequent credit values associated with credit symbols that land as subsequent display symbols to respective credit meters, wherein the subsequent credit values are added to respective existing values of the respective credit meters.

In Example 14, the subject matter of Example 13 optionally includes that a first credit meter corresponding to a first credit reel that landed a first credit symbol as the display symbol on the first spin and a subsequent credit symbol as the display symbol on the subsequent spin has an accumulated credit value that includes a combination of a credit value corresponding to the first credit symbol from the first spin and a subsequent credit value corresponding to the subsequent credit symbol from the subsequent spin.

In Example 15, the subject matter of Example 14 optionally includes that executing the instructions causes the control system to perform operations further comprising: randomly selecting, using a random number generator, a bonus value for a bonus reel; and applying the bonus value of the bonus reel to credit meters that have existing credit values greater than zero, such that the accumulated credit value of the first credit meter includes a combination of the credit value from the first spin, the subsequent credit value from the subsequent spin, and the bonus value.

In Example 16, the subject matter of any one or more of Examples 14-15 optionally include wherein executing the instructions causes the control system to perform operations further comprising: using a first reel strip for the first spin of the first credit reel; and responsive to the first credit reel landing the first credit symbol, using a second reel strip for the subsequent spin of the first credit reel, wherein the second reel strip is different than the first reel strip.

In Example 17, the subject matter of Example 16 optionally includes that the second reel strip increases the likelihood of landing a credit symbol on the first credit reel relative to the first reel strip.

In Example 18, the subject matter of any one or more of Examples 16-17 optionally include wherein the second reel strip increases the credit value of one or more credit symbols relative to the first reel strip.

Example 19 is one or more machine-readable devices storing instructions, wherein the instructions when executed by one or more processors, cause performance of operations, comprising: responsive to initiation of a first spin of a game, randomly selecting, using a random number generator and a plurality of first reel strips that include at least one credit symbol, a display symbol for a plurality of credit reels; responsive to each credit reel of a first set of credit reels landing a credit symbol, applying a credit of each credit symbol to a respective credit meter of a first set of credit meters, wherein each credit meter of the first set of credit meters is associated with a respective credit reel of the first set of credit reels, wherein the first set of credit reels is a subset of the plurality of credit reels, and the first set of credit meters is a subset of a plurality of credit meters; responsive to initiation of a second spin, randomly selecting, using a random number generator, a display symbol for the plurality of credit reels, wherein a plurality of second reel strips are used for the first set of credit reels that landed a credit symbol on the first spin; responsive to each credit reel of a second set of credit reels landing a credit symbol, applying a credit of each credit symbol to a respective credit meter of a second set of credit meters, wherein the second set of credit reels is a subset of the first set of credit reels and the second set of credit meters is a subset of the first set of credit meters, such that each of the credit meters of the second set of credit meters reflects an accrued credit of its associated credit reel including the credit of the second spin added to the credit of the first spin; responsive to each credit reel of a third set of credit reels landing a credit symbol, applying a credit of each credit symbol to a respective credit meter of a third set of credit meters, wherein the third set of credit reels does not include any credit reels of the first or second set of credit reels, and the third set of credit meters does not include any credit meters of the first or second set of credit meters; and randomly selecting, using a random number generator and a special reel strip including at least one special symbol, a display symbol for a special reel, wherein: if the special symbol lands as the display symbol of the special reel, the game continues; and if a symbol other than the special symbol lands as the display symbol for the special reel, the game ends.

In Example 20, the subject matter of Example 19 optionally includes that: the special reel strip is a first special reel strip for a first spin of the special reel; the special reel strip is a second special reel strip for a second spin of the special reel; the special reel strip is a third special reel strip for a third spin of the special reel; and the third special reel strip includes fewer special symbols than the second special reel strip which includes fewer special symbols than the first special reel strip, such that as the game advances, the special reel is less likely to land the special symbol to continue the game.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. A system comprising:
a display system; and
a game controller comprising one or more processors, the game controller executing instructions which cause the game controller to:
 randomly determine, using a random number generator, first display symbols for a plurality of credit reels as part of a first spin;
 for each credit reel that lands a first credit symbol as the first display symbol, control the display system to move a first credit value associated with the first credit symbol to a credit meter associated with the credit reel;
 randomly determine, using the random number generator, a second credit symbol as a subsequent display symbol for the credit reel as part of a second spin;
 combine the first credit value with a second credit value associated with the second credit symbol to create a combined credit value;
 control the display system to display the combined credit values at the credit meter, such that the credit meter accrues credit values of credit symbols that land on the credit reel through multiple spins;
 randomly determine, using the random number generator and a first special reel strip, a first outcome of a special reel, the first special reel strip including a plurality of symbols that provide at least one additional spin; and
 randomly determine, using the random number generator and a subsequent special reel strip, a subsequent outcome of the special reel comprising a display symbol for a bonus reel having a bonus value; and,
 add the bonus value to the combined credit value of each credit meter for the plurality of credit reels having an existing non-zero credit value.

2. The system of claim 1, wherein executing the instructions further causes the game controller to:
responsive to the first outcome of the special reel including a symbol that provides at least one additional spin, controlling the display system to indicate an additional spin is available.

3. The system of claim 2, wherein executing the instructions further causes the game controller to:
responsive to the subsequent outcome of the special reel including a symbol that does not provide at least one additional spin, controlling the display system to indicate that no spins remain.

4. The system of claim 2, wherein executing the instructions further causes the game controller to:
responsive to the first outcome of the special reel including a symbol that provides at least one additional spin, randomly determining, using the random number generator, a display symbol for the bonus reel.

5. The system of claim 1, wherein:
the controller uses a first set of display symbols to select the first display symbol;
the controller uses a second set of display symbols to select the subsequent display symbol; and
the second set of display symbols has a higher ratio of credit symbols than the first set of display symbols.

6. The system of claim 1, wherein:
the controller uses a first set of display symbols to select the first display symbol;
the controller uses a second set of display symbols to select the subsequent display symbol; and the second set of display symbols has credit symbols with higher credit values than the first set of display symbols.

7. The system of claim 1, wherein determining first display symbols for a plurality of credit reels comprises:
using a first set of display symbols and a first weighted table for a first portion of the plurality of credit reels; and
using a second set of display symbols and a second weighted table for a second portion of the plurality of credit reels.

8. The system of claim 7, wherein the instructions cause the game controller to randomly select, using a random number generator, each credit reel that forms the first portion of the plurality of credit reels.

9. A gaming system, comprising:
a user interface system configured for receiving an indication to initiate a first spin of a game;
a display system comprising one or more displays; and
a control system comprising one or more processors, wherein the control system executes instructions which cause the control system to perform operations comprising:
responsive to receiving indication to initiate the first spin via the user interface, randomly selecting, using a random number generator, first display symbols for a plurality of credit reels;
applying one or more credit values associated with one or more credit symbols that land as display symbols to one or more respective credit meters of a plurality of credit meters, wherein each credit meter corresponds to a credit reel of the plurality of credit reels, such that the corresponding credit meter tracks an accumulated credit value of credit symbols that land on the credit reel over a plurality of spins; and
randomly selecting, using a random number generator, a display symbol from one of a plurality of special reel strips for a special reel comprising a display symbol for a bonus reel having a bonus value; and,
adding the bonus value to the combined credit value of each credit meter for the plurality of credit reels having an existing non-zero credit value.

10. The gaming system of claim 9, wherein executing the instructions causes the control system to perform operations further comprising:
responsive to receiving indication to initiate a subsequent spin via the user interface, randomly selecting using a random number generator, display symbols for the plurality of credit reels; and
applying subsequent credit values associated with credit symbols that land as subsequent display symbols to respective credit meters, wherein the subsequent credit values are added to respective existing values of the respective credit meters.

11. The gaming system of claim 10, wherein a first credit meter corresponding to a first credit reel that landed a first credit symbol as the display symbol on the first spin and a subsequent credit symbol as the display symbol on the subsequent spin has an accumulated credit value that includes a combination of a credit value corresponding to the first credit symbol from the first spin and a subsequent credit value corresponding to the subsequent credit symbol from the subsequent spin.

12. The gaming system of claim 11, wherein executing the instructions causes the control system to perform operations further comprising:
randomly selecting, using a random number generator, a bonus value for the bonus reel; and
applying the bonus value of the bonus reel to credit meters that have existing credit values greater than zero, such that the accumulated credit value of the first credit meter includes a combination of the credit value from the first spin, the subsequent credit value from the subsequent spin, and the bonus value.

13. The gaming system of claim 11, wherein executing the instructions causes the control system to perform operations further comprising:
using a first reel strip for the first spin of the first credit reel; and
responsive to the first credit reel landing the first credit symbol, using a second reel strip for the subsequent spin of the first credit reel, wherein the second reel strip is different than the first reel strip.

14. The gaming system of claim 13, wherein the second reel strip increases a likelihood of landing a credit symbol on the first credit reel relative to the first reel strip.

15. The gaming system of claim 13, wherein the second reel strip increases the credit value of one or more credit symbols relative to the first reel strip.

16. The gaming system of claim 9, wherein the bonus value is only applied to any credit meters that have an existing credit value greater than zero, such that:
each credit meter with an existing credit value greater than zero has the existing credit value increased by the bonus value; and
credit meters with an existing credit value of zero will still have a credit value of zero.

17. One or more machine-readable devices storing instructions, wherein the instructions when executed by one or more processors, cause performance of operations, comprising:
responsive to initiation of a first spin of a game, randomly selecting, using a random number generator and a plurality of first reel strips that include at least one credit symbol, a display symbol for a plurality of credit reels;
responsive to each credit reel of a first set of credit reels landing a credit symbol, applying a credit of each credit symbol to a respective credit meter of a first set of credit meters, wherein each credit meter of the first set of credit meters is associated with a respective credit reel of the first set of credit reels, wherein the first set of credit reels is a subset of the plurality of credit reels, and the first set of credit meters is a subset of a plurality of credit meters;
responsive to initiation of a second spin, randomly selecting, using a random number generator, a display symbol for the plurality of credit reels, wherein a plurality of second reel strips are used for the first set of credit reels that landed a credit symbol on the first spin;
responsive to each credit reel of a second set of credit reels landing a credit symbol, applying a credit of each credit symbol to a respective credit meter of a second set of credit meters, wherein the second set of credit reels is a subset of the first set of credit reels and the second set of credit meters is a subset of the first set of credit meters, such that each of the credit meters of the second set of credit meters reflects an accrued credit of its associated credit reel including the credit of the second spin added to the credit of the first spin;
responsive to each credit reel of a third set of credit reels landing a credit symbol, applying a credit of each credit symbol to a respective credit meter of a third set of credit meters, wherein the third set of credit reels does not include any credit reels of the first or second set of credit reels, and the third set of credit meters does not include any credit meters of the first or second set of credit meters; and randomly selecting, using a random number generator and a special reel strip including at least one special symbol, a display symbol for a special reel comprising a display symbol for a bonus reel having a bonus value; and adding the bonus value to the combined credit value of each credit meter for the plurality of credit reels having an existing non-zero credit value.

18. The one or more machine-readable devices storing instructions of claim 17, wherein:

the special reel strip is a first special reel strip for a first spin of the special reel;

the special reel strip is a second special reel strip for a second spin of the special reel;

the special reel strip is a third special reel strip for a third spin of the special reel; and the third special reel strip includes fewer special symbols than the second special reel strip which includes fewer special symbols than the first special reel strip, such that as the game advances, the special reel is less likely to land the special symbol to continue the game.

\* \* \* \* \*